United States Patent
Kobayashi et al.

(10) Patent No.: US 8,374,264 B2
(45) Date of Patent: Feb. 12, 2013

(54) SIGNAL PROCESSING APPARATUS AND METHOD

(75) Inventors: Kenichi Kobayashi, Tokyo (JP); Yuken Goto, Tokyo (JP); Takuya Okamoto, Chiba (JP); Lachlan Bruce Michael, Saitama (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 12/836,893

(22) Filed: Jul. 15, 2010

(65) Prior Publication Data

US 2011/0019782 A1  Jan. 27, 2011

(30) Foreign Application Priority Data

Jul. 24, 2009  (JP) ................ P2009-173591

(51) Int. Cl.
*H04L 27/28* (2006.01)
(52) U.S. Cl. ......... 375/260; 375/226; 375/316; 375/362
(58) Field of Classification Search .................. 375/260, 375/226, 362, 316
See application file for complete search history.

(56) References Cited

U.S. PATENT DOCUMENTS
2009/0225822 A1* 9/2009 Tupala et al. ................. 375/226

OTHER PUBLICATIONS

"Frame Structure channel coding and modulation for a second generation digital terrestrial television broadcasting system (DVB-T2)", DVB Document A122 Jun. 2008.

* cited by examiner

*Primary Examiner* — Sam K Ahn
*Assistant Examiner* — Leila Malek
(74) *Attorney, Agent, or Firm* — Frommer Lawrence & Haug LLP; William S. Frommer

(57) ABSTRACT

Disclosed herein is a signal processing apparatus, including: a computation device operable to perform transform computation adapted to Fourier-transform a time domain OFDM i.e., Orthogonal Frequency Division Multiplexing signal into a frequency domain OFDM signal; a processing device operable to perform carrier frequency offset detection adapted to detect an estimated carrier frequency offset that is an error of a carrier used for demodulation of the OFDM signal; and a carrier frequency offset correction device operable to perform carrier frequency offset correction adapted to correct the carrier frequency offset of the frequency domain OFDM signal in accordance with the estimated carrier frequency offset.

5 Claims, 15 Drawing Sheets

CALIBRATION OF P1 SYMBOL

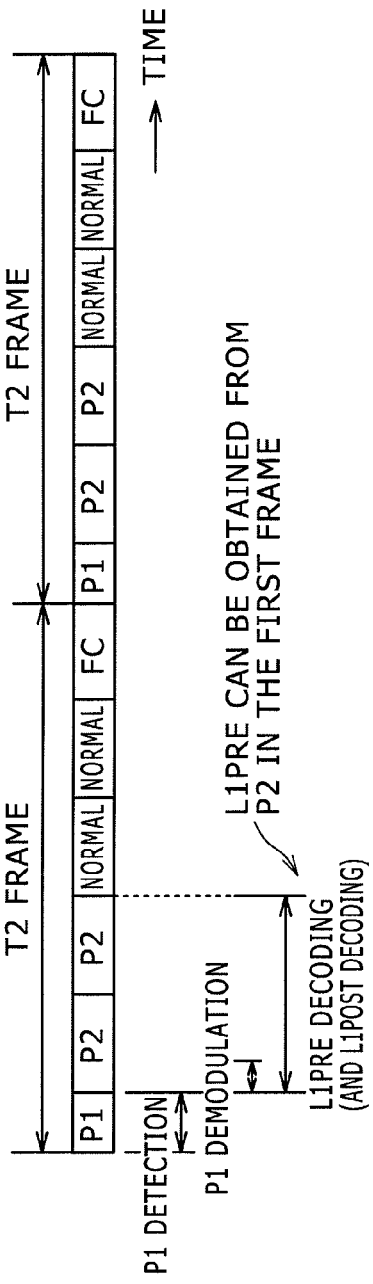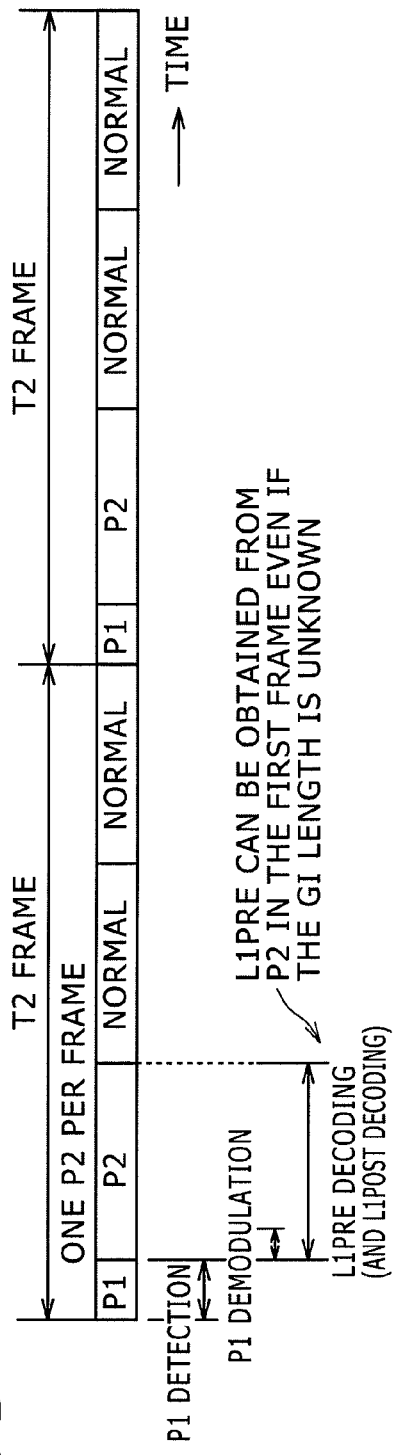

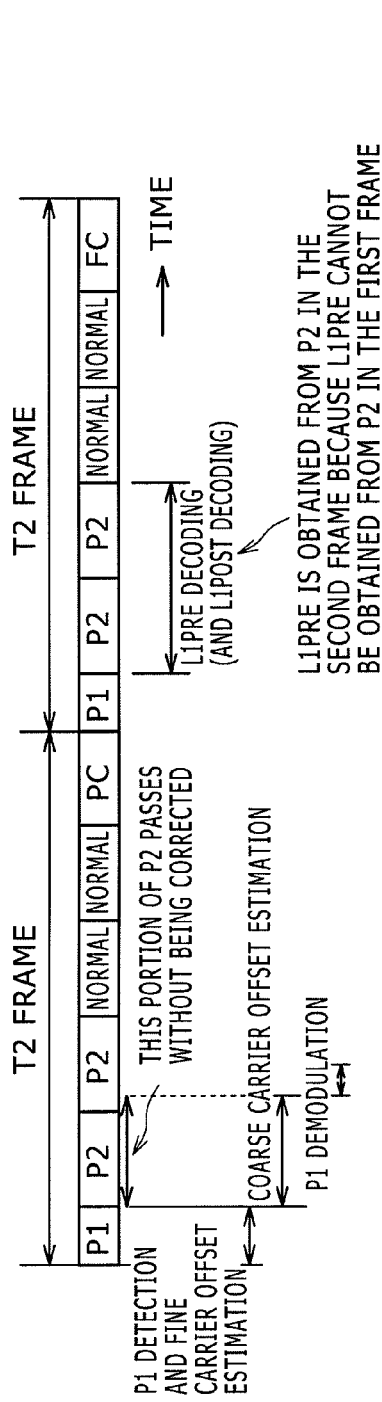
FIG. 10A  WHEN FFT SIZE IS OTHER THAN 16K OR 32K
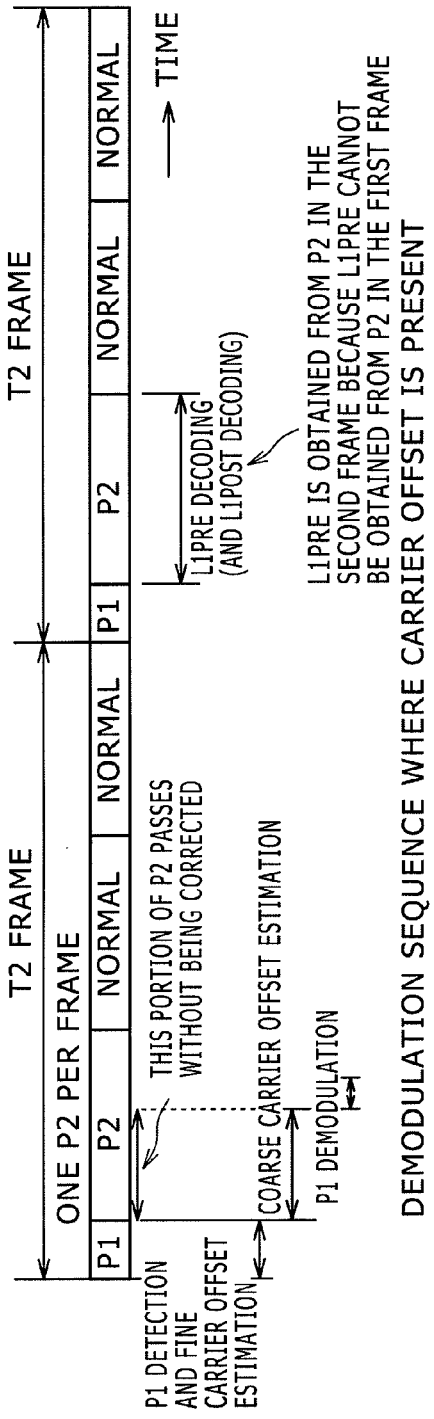
FIG. 10B  WHEN FFT SIZE IS 16K OR 32K
DEMODULATION SEQUENCE WHERE CARRIER OFFSET IS PRESENT

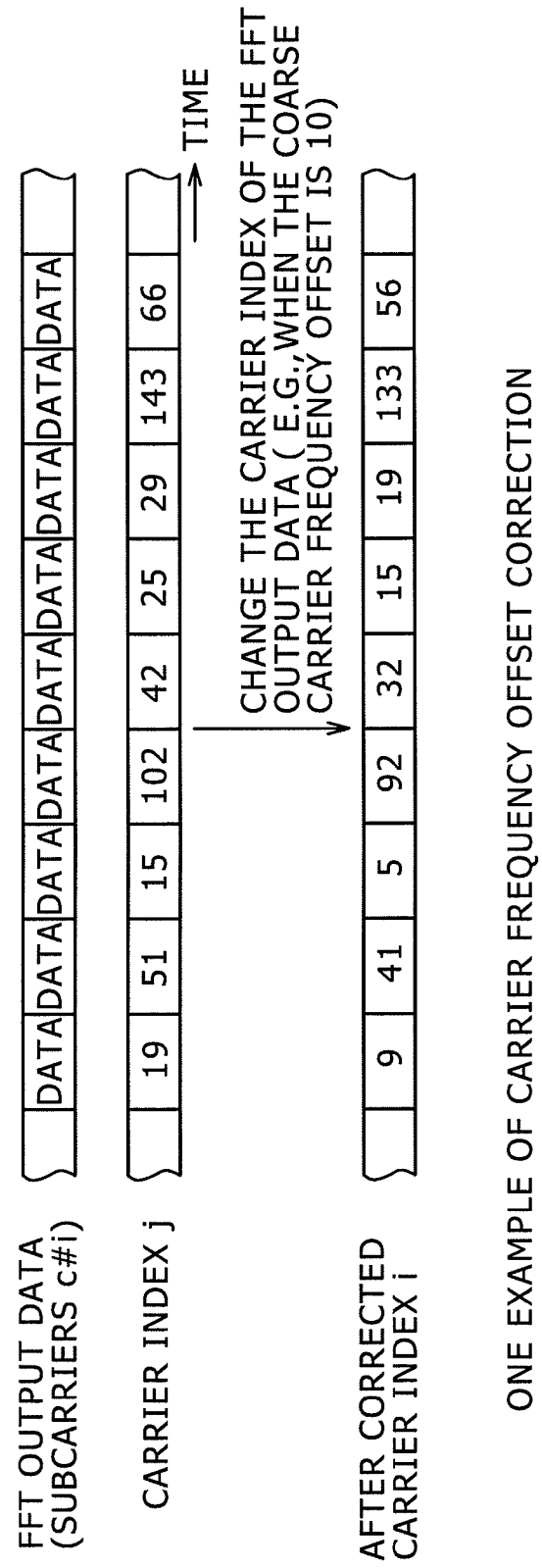

SIGNAL PROCESSING APPARATUS AND METHOD

BACKGROUND OF THE INVENTION

1. Field of the Invention

The present invention relates to a signal processing apparatus and method, and more particularly, for example, to a signal processing apparatus and method for speedily demodulating an OFDM (Orthogonal Frequency Division Multiplexing) signal.

2. Description of the Related Art

OFDM (Orthogonal Frequency Division Multiplexing) has been adopted for terrestrial digital broadcasting and other broadcasting as a data (signal) modulation scheme.

OFDM uses a number of subcarriers orthogonal to each other within the transmission band, performing PSK (Phase Shift Keying), QAM (Quadrature Amplitude Modulation) or other digital modulation in which data is assigned to the amplitude or phase of each subcarrier.

In OFDM, the transmission band is divided with a number of subcarriers, leading to narrow band for one (wave of) subcarrier and slow modulation speed, but total (whole subcarriers) transmission speed remains the same in the existing modulation scheme.

As described above, data is assigned to a plurality of subcarriers in OFDM. As a result, modulation can be achieved by IFFT (Inverse Fast Fourier Transform) computation adapted to perform an inverse Fourier transform. On the other hand, demodulation of the OFDM signal resulting from modulation can be achieved by FFT (Fast Fourier Transform) computation.

Therefore, an OFDM transmitter adapted to transmit an OFDM signal can be configured with a circuit adapted to perform IFFT computation. On the other hand, an OFDM receiver adapted to receive an OFDM signal can be configured with a circuit adapted to perform FFT computation.

Further, OFDM has signal intervals called guard intervals, thus providing improved multipath immunity. Still further, known signals (signals known to the OFDM receiver), i.e., pilot signals, are inserted discretely in the direction of time or frequency in OFDM so that the OFDM receiver uses these signals for synchronization, estimation of the transmission line (channel) characteristic or other purposes.

Thanks to its high multipath immunity, OFDM has been adopted for terrestrial digital broadcasting and other broadcasting systems subject to significant multipath interference. Among the terrestrial digital broadcasting standards adopting OFDM are DVB-T (Digital Video Broadcasting-Terrestrial) and ISDB-T (Integrated Services Digital Broadcasting-Terrestrial).

With OFDM, data is transmitted in units of an OFDM symbol.

FIG. 1 is a diagram illustrating an OFDM symbol.

An OFDM symbol commonly includes an effective symbol and a guard interval. The effective symbol is a signal period during which IFFT is performed during modulation. The guard interval is a copy of part of the latter half of the effective symbol and attached beginning of the effective symbol.

Thus, providing a guard interval beginning of an OFDM symbol provides improved multipath immunity.

It should be noted that a unit called a frame (OFDM transmission frame) is defined to include a plurality of OFDM symbols in the terrestrial digital broadcasting standard that has adopted OFDM so that data is transmitted in units of a frame.

An OFDM receiver adapted to receive such an OFDM signal performs digital orthogonal demodulation of the OFDM signal using a carrier of the same signal.

It should be noted, however, that the OFDM signal carrier used by an OFDM receiver for digital orthogonal demodulation contains some error because this carrier is not the same as that used by an OFDM transmitter adapted to transmit the OFDM signal. That is, the frequency of the OFDM signal carrier used for digital orthogonal demodulation deviates from the center frequency of the OFDM signal (IF (Intermediate Frequency) signal) received by the OFDM receiver.

Therefore, the OFDM receiver estimates the carrier frequency offset that is an error of the OFDM signal carrier used for digital orthogonal demodulation, and performs carrier frequency offset detection adapted to detect the estimated offset and carrier frequency offset correction adapted to correct the OFDM signal (its carrier frequency offset), thus eliminating the offset in accordance with the estimated offset.

FIG. 2 is a block diagram illustrating an example of configuration of an existing OFDM receiver.

A carrier frequency offset correction section 11 is supplied with a baseband time domain OFDM signal (OFDM time domain signal) obtained after the digital orthogonal demodulation of the OFDM signal.

The same section 11 performs the carrier frequency offset correction adapted to correct the OFDM time domain signal (offset thereof) supplied thereto in accordance with the carrier frequency offset correction amount supplied from a carrier frequency offset correction amount estimation section 15 which will be described later.

The carrier frequency offset correction section 11 supplies the OFDM time domain signal subjected to the carrier frequency offset correction to an FFT computation section 12 and time domain carrier frequency offset detection section 13.

The FFT computation section 12 performs FFT computation adapted to Fourier-transform an OFDM time domain signal from the carrier frequency offset correction section 11 into a frequency domain OFDM signal (OFDM frequency domain signal) and supplies the OFDM frequency domain signal obtained from the FFT computation to a frequency domain carrier frequency offset detection section 14.

It should be noted that the OFDM frequency domain signal obtained from the FFT computation section 12 is supplied not only to the frequency domain carrier frequency offset detection section 14 but also to unshown blocks in the subsequent stage adapted to handle equalization, error correction, decoding and other processes.

The time domain carrier frequency offset detection section 13 performs carrier frequency offset detection adapted to detect the estimated carrier frequency offset by estimating the carrier frequency offset of the OFDM time domain signal using the OFDM time domain signal from the carrier frequency offset correction section 11. The time domain carrier frequency offset detection section 13 supplies (feeds back) the estimated carrier frequency offset obtained from the carrier frequency offset detection to the carrier frequency offset correction amount estimation section 15.

The frequency domain carrier frequency offset detection section 14 performs carrier frequency offset detection adapted to detect the estimated carrier frequency offset by estimating the carrier frequency offset of the OFDM frequency domain signal using the OFDM time domain signal from the FFT computation section 12. The same section 14 supplies (feeds back) the estimated carrier frequency offset obtained from the carrier frequency offset detection to the carrier frequency offset correction amount estimation section 15.

The carrier frequency offset correction amount estimation section 15 estimates the (OFDM time domain signal) correction amount adapted to eliminate the carrier frequency offset of the OFDM time domain signal using either or both of the estimated carrier frequency offsets, one from the time domain carrier frequency offset detection section 13 and another from the frequency domain carrier frequency offset detection section 14. The same section 15 supplies the correction amount to the carrier frequency offset correction section 11.

As described above, the same section 11 corrects the OFDM time domain signal supplied thereto (performs carrier frequency offset correction) in accordance with the correction amount from the carrier frequency offset correction amount estimation section 15.

Incidentally, DVB-T2 (second generation European terrestrial digital broadcasting standard) is on its way to being developed.

It should be noted that DVB-T2 is described in the so-called Blue Book (DVB BlueBook A122) ("Frame structure channel coding and modulation for a second generation digital terrestrial television broadcasting system (DVB-T2)," DVB Document A122 June 2008).

In DVB-T2 (the Blue Book thereof), a frame called a T2 frame is defined so that data is transmitted in units of a T2 frame.

A T2 frame contains two preamble signals called P1 and P2. These preamble signals contain information required for demodulation and other processes (such information is signalled).

FIG. 3 is a diagram illustrating a T2 frame format.

A T2 frame contains one P1 OFDM symbol, one or more P2 OFDM symbols, one or more data (Normal) OFDM symbols, and a necessary FC (Frame Closing) OFDM symbol in this order.

Bits S1 and S2 are, for example, signalled in P1.

The bits S1 and S2 indicate the following information, i.e., whether the symbols other than the P1 (P2, data and FC symbols) are transmitted in SISO (Single Input Single Output) or MISO (Multiple Input Single Output) system, the FFT size for performing FFT computation of the symbols other than P1 (number of samples (symbols) (subcarriers) subject to a single FFT computation) and to which of two groups the guard interval length (hereinafter also referred to as a GI length) belongs.

It should be noted that seven different lengths, i.e., $1/128$, $1/32$, $1/16$, $19/256$, $1/8$, $19/128$ and $1/4$, are defined relative to the effective symbol length in DVB-T2 as the GI length. These seven GI lengths are classified into two groups. The bits S1 and S2 signalled in P1 contain information as to which of the two groups the GI length of the T2 frame belongs to.

Further, six different numbers of symbols (subcarriers) making up a single OFDM symbol, i.e., FFT sizes, are defined. These sizes are 1 K, 2 K, 4 K, 8 K, 16 K and 32 K.

It should be noted, however, that although any of the above six different FFT sizes can be used for OFDM symbols other than P1 OFDM symbol, only 1 K can be used for P1 OFDM symbol.

As for the FFT size and GI length of P2, on the other hand, the same values as those of the OFDM symbols other than P1 and P2, i.e., data (Normal) and FC OFDM symbols, are used.

Here, P1 contains information required for demodulation of P2 such as the transmission system and FFT size. Therefore, P1 must be demodulated to demodulate P2.

L1PRE and L1POST are signalled in P2.

L1PRE contains information required for the OFDM receiver adapted to receive a T2 frame to demodulate L1POST. L1POST contains information required for the OFDM receiver to access the physical layer (layer pipes thereof).

Here, L1PRE contains information including the GI length, the pilot pattern (PP) indicating the pilot signal arrangement that shows in which symbol (subcarrier) the pilot signal, i.e., the known signal, is contained, whether the transmission band is extended to transmit the OFDM signal (BWT_EXT) and the number of OFDM symbols in one T2 frame (NDSYM). These pieces of information are required to demodulate a symbol containing data (including FC).

After obtaining L1PRE and L1POST (information signalled therein), the OFDM receiver can demodulate the symbol of the data (and FC).

It should be noted that although, in FIG. 3, two P2 OFDM symbols are provided in the T2 frame, any of one to sixteen (16) P2 OFDM symbols may be provided in a T2 frame. However, only one P2 OFDM symbol is provided in a T2 frame containing P2 with an FFT size of 16 K or 32 K.

FIG. 4 is a diagram illustrating a P1 OFDM signal.

A P1 OFDM signal has 1 K (=1024) symbols as effective symbols.

The P1 OFDM signal has a cyclic structure that includes B1', B1, B2 and B2': B1' is a signal obtained by frequency-shifting B1 that is part of the effective symbols in the beginning; B1' is copied before the effective symbols; B2' is a signal obtained by frequency-shifting B2 that is the remaining effective symbols; and B2' is copied after the effective symbols.

The P1 OFDM signal has 853 subcarriers as effective subcarriers. In DVB-T2, 384 at predetermined positions of all the 853 subcarriers are assigned information (locations).

According to the DVB-T2 Implementation Guidelines (ETSI TR 102 831: IG), if the OFDM signal transmission band is, for example, 8 MHz, it is possible to perform "coarse" carrier frequency offset estimation in units of a subcarrier spacing spanning a maximum range from −500 kHz to +500 kHz based on the correlation between the above 384 subcarrier locations.

Further, according to the Implementation Guidelines, it is possible, thanks to the cyclic structure of P1 described in FIG. 4, to perform "fine" carrier frequency offset estimation in units of less than a subcarrier spacing in the range from −0.5× subcarrier spacing to +0.5× subcarrier spacing.

Here, DVB-T2 defines that the FFT size of P1 is 1 K samples (symbols) described in FIG. 4.

Further, DVB-T2 defines that if the transmission band is, for example, 8 MHz, the sampling period of P1 with an FFT size of 1 K samples is $7/64$ μs.

Therefore, if the transmission band is, for example, 8 MHz, the P1 effective symbol length $T_u$ is $1024 \times 7/64$ μs.

On the other hand, the relationship expressed by the equation $D=1/T_u$ holds between the effective OFDM symbol length (effective symbol length not including the guard interval) $T_u$ [sec] and the OFDM signal subcarrier spacing D [Hz].

Therefore, if the transmission band is, for example, 8 MHz, the P1 subcarrier spacing D is equal to the reciprocal of the effective symbol length $T_u=1024 \times 7/64$ μsec or about 8929 Hz.

As described above, because the P1 subcarrier spacing D is about 8929 Hz, the "fine" estimated carrier frequency offset that can be detected using P1 falls within the range from −8929/2 Hz to +8929/2 Hz.

In this case, the capture range using P1, i.e., the range of frequencies over which OFDM signal carriers used for digital orthogonal demodulation can be pulled in through OFDM signal correction in accordance with the "fine" estimated carrier frequency offset obtained from P1 (range of frequencies over which carrier frequency offset correction can be performed) is in the range 8929/2 Hz above and below the inherent subcarrier position on the frequency axis (frequency) (from −8929/2 Hz to +8929/2 Hz).

Here, the i+1th (where i=0, 1, . . . ) subcarrier from the lowest in frequency of a plurality of OFDM signal subcarriers (OFDM symbols) is denoted by a subcarrier c#i. The inherent frequency (position on the frequency axis) of the subcarrier c#i is referred to as a set frequency f#i.

The OFDM receiver detects, by means of the "fine" carrier frequency offset estimation using P1, the difference between the frequency of the subcarrier c#i of the OFDM signal and a set frequency f#i' closest to that frequency as a "fine" estimated carrier frequency offset.

Then, the carrier frequency offset correction is performed to correct the OFDM signal in accordance with the "fine" estimated carrier frequency offset so that the frequency of the subcarrier c#i agrees with the set frequency f#i' closest to that frequency.

Further, the OFDM receiver detects, by means of the "coarse" carrier frequency offset estimation using P1, the difference between the frequency of the subcarrier c#i of the OFDM signal and the set frequency f#i of the subcarrier c#i as a "coarse" estimated carrier frequency offset in units of a subcarrier spacing.

Then, the carrier frequency offset correction is performed to correct the OFDM signal in accordance with the "coarse" estimated carrier frequency offset so that the frequency of the subcarrier c#i agrees with the set frequency f#i of the subcarrier c#i.

Here, the carrier frequency offset correction performed in accordance with the "fine" estimated carrier frequency offset is referred to as a "fine" carrier frequency offset correction, and that performed in accordance with the "coarse" estimated carrier frequency offset as a "coarse" carrier frequency offset correction.

SUMMARY OF THE INVENTION

Incidentally, if an OFDM signal has a large carrier frequency offset that falls outside the range from −0.5× subcarrier spacing to +0.5× subcarrier spacing, it may take a long time to perform "coarse" carrier frequency offset estimation using P1.

The "coarse" carrier frequency offset correction can only be performed after the "coarse" carrier frequency offset estimation using P1 and the detection of the estimated offset. Therefore, if the "coarse" carrier frequency offset estimation using P1 takes a long time, it is impossible to establish synchronization and demodulate P2 and data (including FC) symbols in the first T2 frame received after the OFDM signal reception begins. As a result, it may be necessary to wait until the next T2 frame is received before initiating the demodulation of P2 and data symbols.

That is, P2 is arranged following P1 among OFDM symbols as illustrated in FIG. 3.

In the existing OFDM receiver illustrated in FIG. 2, therefore, if the time domain carrier frequency offset detection section 13 spends a long time performing "coarse" carrier frequency offset estimation using P1, P2 following P1 passes through the carrier frequency offset correction section 11 during that period. As a result, it is impossible to perform "coarse" carrier frequency offset correction of the portion of P2 that has already passed through the same section 11.

If an OFDM signal has a "coarse" carrier frequency offset or a carrier frequency offset that falls outside the range from −0.5× subcarrier spacing to +0.5× subcarrier spacing, it is extremely unlikely that correct information can be extracted (demodulated) from the OFDM signal in this condition (OFDM signal that has yet to be subjected to the "coarse" carrier frequency offset correction). Therefore, if P2 (or at least part thereof) passes through the carrier frequency offset correction section 11 while the "coarse" carrier frequency offset estimation using P1 is in progress, it is difficult to demodulate P2 properly.

This makes it impossible to demodulate P2 and data symbols (including FC) in the first T2 frame received after the OFDM signal reception begins. Therefore, it is necessary to wait for the next T2 frame before initiating the demodulation of P2 and data symbols.

In light of the foregoing, there is a need for the present invention to establish synchronization (bring the frequency of the subcarrier c#i into agreement with the set frequency of the subcarrier c#i) more quickly so as to ensure quick demodulation of OFDM signals.

An embodiment of the present invention is a signal processing apparatus that includes computation means, processing means and carrier frequency offset correction means. The computation means performs transform computation adapted to Fourier-transform a time domain OFDM i.e., Orthogonal Frequency Division Multiplexing signal into a frequency domain OFDM signal. The processing means performs carrier frequency offset detection adapted to detect an estimated carrier frequency offset that is an error of a carrier used for demodulation of the OFDM signal. The carrier frequency offset correction means performs carrier frequency offset correction adapted to correct the barrier frequency offset of the frequency domain OFDM signal in accordance with the estimated carrier frequency offset. The OFDM signal contains a first preamble signal and a second preamble signal following the first preamble signal. The computation means performs the transform computation of the second preamble signal in parallel with the carrier frequency offset detection performed by the processing means using the first preamble signal.

A signal processing method according to another embodiment of the present invention includes a computing step, processing step and carrier frequency offset correcting step. In the computing step, a signal processing apparatus performs transform computation adapted to Fourier-transform a time domain OFDM i.e., Orthogonal Frequency Division Multiplexing signal into a frequency domain OFDM signal. In the processing step, the signal processing apparatus performs carrier frequency offset detection adapted to detect an estimated carrier frequency offset that is an error of a carrier used for demodulation of the OFDM signal. In the carrier frequency offset correcting step, the signal processing apparatus performs carrier frequency offset correction adapted to correct the carrier frequency offset of the frequency domain OFDM signal in accordance with the estimated carrier frequency offset. The OFDM signal contains a first preamble signal and a second preamble signal following the first preamble signal. The computing step performs the transform computation of the second preamble signal in parallel with the carrier frequency offset detection performed by the processing step using the first preamble signal.

In the above embodiments, transform computation is performed to Fourier-transform a time domain OFDM signal into a frequency domain OFDM signal. Carrier frequency offset detection is performed to detect an estimated carrier frequency offset that is an error of a carrier used for demodulation of the OFDM signal. Further, carrier frequency offset correction is performed to correct the carrier frequency offset of the frequency domain OFDM signal in accordance with the estimated carrier frequency offset. In this case, the OFDM signal contains a first preamble signal and a second preamble signal following the first preamble signal. The transform computation of the second preamble signal is performed in parallel with the carrier frequency offset detection using the first preamble signal.

It should be noted that the signal processing apparatus may be an independent apparatus or an internal block making up an independent apparatus.

An embodiments of the present invention permits fast demodulation of an OFDM signal.

BRIEF DESCRIPTION OF THE DRAWINGS

FIGS. 9A and 9B are diagrams describing the demodulation of the OFDM signal using presets;

FIGS. 10A and 10B are diagrams describing the demodulation of the OFDM signal using presets when the OFDM signal has a "coarse" carrier frequency offset;

FIG. 12 is a diagram describing "coarse" carrier frequency offset correction by a frequency domain carrier frequency offset correction section;

DETAILED DESCRIPTION OF THE PREFERRED EMBODIMENTS

First Embodiment

[Configuration Example of Signal Processing Apparatus]

Figure 5:
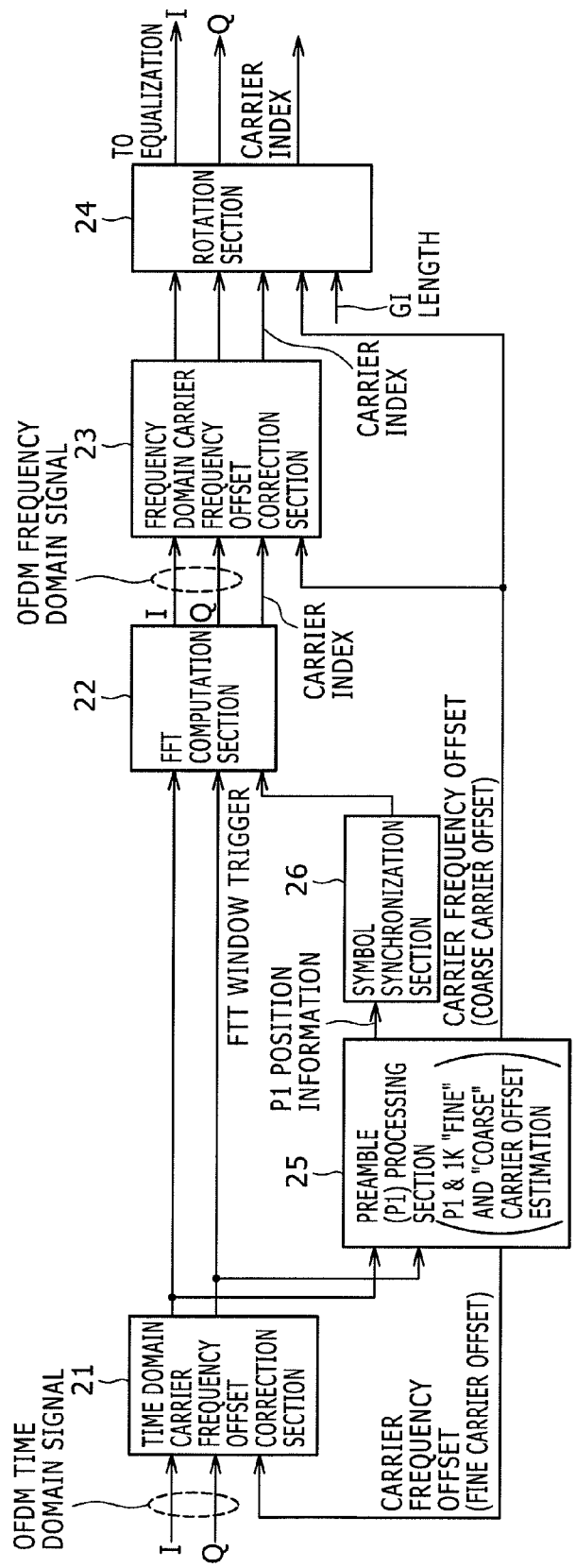
FIG. 5 is a block diagram illustrating a configuration example of a first embodiment of a signal processing apparatus to which an embodiment of the present invention is applied.

FIG. 5 is a block diagram illustrating a configuration example of a first embodiment of the signal processing apparatus to which the present invention is applied.

In FIG. 5, the signal processing apparatus functions, for example, as an OFDM receiver adapted to receive and demodulate a DVB-T2 OFDM signal.

That is, in FIG. 5, the signal processing apparatus includes a time domain carrier frequency offset correction section 21, FFT computation section 22, frequency domain carrier frequency offset correction section 23, rotation section 24, preamble processing section 25 and symbol synchronization section 26.

The time domain carrier frequency offset correction section 21 is supplied with an OFDM time domain signal.

That is, the OFDM receiver extracts, for example, the OFDM signal of the user-selected channel (OFDM signal in the frequency band associated with the channel) from the OFDM signal transmitted from the OFDM transmitter adapted to transmit an OFDM signal.

Further, the OFDM receiver performs digital orthogonal demodulation of the OFDM signal of the user-selected channel (hereinafter referred to as the channel of interest) using a carrier at a given frequency (carrier frequency) (ideally, the same carrier as used by the OFDM transmitter) and the signal orthogonal to the carrier. The OFDM receiver supplies the baseband OFDM signal obtained from the digital orthogonal demodulation to the time domain carrier frequency offset correction section 21.

Here, the OFDM signal supplied to the time domain carrier frequency offset correction section 21 is a time domain signal that has yet to be subjected to the FFT computation (signal immediately after the IFFT computation of the symbol in the IQ constellation (data transmitted on a single subcarrier) by the OFDM transmitter). Therefore, this OFDM signal is also referred to as an OFDM time domain signal.

The OFDM time domain signal is a complex signal expressed by a complex number that includes a real axis (I (In-phase)) component and an imaginary axis (Q (Quadrature-phase)) component.

The time domain carrier frequency offset correction section 21 is supplied with not only the OFDM time domain signal but also the "fine" estimated carrier frequency offset detected by the "fine" carrier frequency offset estimation using P1 from the preamble processing section 25.

The time domain carrier frequency offset correction section 21 performs "fine" carrier frequency offset correction adapted to correct the OFDM time domain signal supplied thereto in accordance with the "fine" estimated carrier frequency offset from the preamble processing section 25.

The same section 21 supplies the OFDM time domain signal resulting from the "fine" carrier frequency offset correction to the FFT computation section 22 and preamble processing section 25.

The FFT computation section 22 extracts as much of the OFDM time domain signal (the sample value thereof) from the OFDM time domain signal supplied from the time domain carrier frequency offset correction section 21 as the FFT size in accordance with FFT trigger information (FFT Window trigger) supplied from the symbol synchronization section 26, thus performing FFT computation which is a fast DFT (Discrete Fourier Transform) computation.

That is, the FFT trigger information supplied from the symbol synchronization section 26 represents the start position of the interval subject to FFT computation (FFT computation start position) and the interval size (FFT size) for the OFDM time domain signal.

The FFT computation section 22 extracts, in accordance with the FFT trigger information supplied from the symbol synchronization section 26, as much of the OFDM time domain signal as indicated by the FFT size in the FFT trigger information starting from the position indicated by the FFT trigger information as an OFDM time domain signal for the interval subject to FFT computation (hereinafter also referred to as an FFT interval).

As a result, a symbol having an effective symbol length excluding the guard interval (symbol thereof) is ideally extracted as an OFDM time domain signal for the FFT interval from the symbol making up a single OFDM symbol contained in the OFDM time domain signal.

Then, the FFT computation section 22 performs FFT computation on the OFDM time domain signal for the FFT interval (symbol having an effective symbol length).

The FFT computation on the OFDM time domain signal by the FFT computation section 22 provides the information transmitted on the subcarrier, i.e., the OFDM signal representing the symbol in the IQ constellation.

It should be noted that the OFDM signal obtained from the FFT computation on the OFDM time domain signal is a frequency domain signal and will be hereinafter also referred to as an OFDM frequency domain signal.

The FFT computation section 22 supplies the OFDM frequency domain signal obtained from the FFT computation performed on the OFDM symbols of the OFDM time domain signal, i.e., a group of subcarriers making up the OFDM symbols, to the frequency domain carrier frequency offset correction section 23.

Here, the FFT computation section 22 supplies not only the group of subcarriers c#i making up the OFDM symbols that are an OFDM frequency domain signal but also a carrier index j representing the subcarriers c#i to the frequency domain carrier frequency offset correction section 23.

That is, letting the carrier index of the j+1th (where j=0, 1, ...) subcarrier from the lowest in frequency of the group of subcarriers c#i making up the OFDM symbols be denoted by letter j, the FFT computation section 22 associates the carrier index j with the j+1th subcarrier c#1, supplying the carrier index j to the frequency domain carrier frequency offset correction section 23 together with the arrangement of the plurality of subcarriers c#i as the group of subcarriers c#i making up the OFDM symbols.

It should be noted that if the OFDM frequency domain signal has, for example, a carrier frequency offset of +K subcarrier in the upward direction, the relationship expressed by the equation j=i+K holds between i of the subcarrier c#i output from the FFT computation section 22 and j of the carrier index j.

The frequency domain carrier frequency offset correction section 23 is supplied with not only the OFDM frequency domain signal from the FFT computation section 22 but also a "coarse" estimated carrier frequency offset detected by the "coarse" carrier frequency offset estimation using P1 from the preamble processing section 25.

The same section 23 performs "coarse" carrier frequency offset correction adapted to correct the OFDM time domain signal from the FFT computation section 22 in accordance with the "coarse" estimated carrier frequency offset from the preamble processing section 25.

Here, if the OFDM signal has a "coarse" carrier frequency offset, the subcarrier c#i making up the OFDM symbol that is the OFDM time domain signal obtained from the FFT computation section 22 is located close to a set frequency f#j rather than its (inherent) set frequency f#i. As a result, the FFT computation section 22 associates the subcarrier c#i with a carrier index j(=i+K) rather than the inherent carrier index i.

The frequency domain carrier frequency offset correction section 23 changes, for example, the carrier index j that is not the inherent carrier index of the subcarrier c#i from the carrier index j to the inherent carrier index i as the "coarse" carrier frequency offset correction.

The same section 23 supplies the OFDM frequency domain signal resulting from the "coarse" carrier frequency offset correction to the rotation section 24 together with the carrier index.

The rotation section 24 is supplied not only with the OFDM frequency domain signal and carrier index from the frequency domain carrier frequency offset correction section 23 but also other information. Such information includes a GI length estimated from the OFDM signal by an unshown block or a GI length included in the information made available in advance in the OFDM receiver (hereinafter also referred to as preset). Such information also includes a "coarse" estimated carrier frequency offset detected by the "coarse" carrier frequency offset estimation using P1 from the preamble processing section 25.

The rotation section 24 performs correction adapted to rotate the OFDM frequency domain signal from the frequency domain carrier frequency offset correction section 23 in the IQ constellation in accordance with the GI length and "coarse" estimated carrier frequency offset. The same section 24 supplies the OFDM frequency domain signal resulting from the correction to unshown blocks in the subsequent stage adapted to handle equalization, error correction, decoding and other processes together with the carrier index supplied from the frequency domain carrier frequency offset correction section 23.

That is, we assume that the OFDM frequency domain signal supplied from the frequency domain carrier frequency offset correction section 23 to the rotation section 24 has a "coarse" carrier frequency offset. Letting this offset be denoted by letter e, and the GI length of the OFDM signal by letter r, each symbol is rotated by e×r. Therefore, the rotation section 24 performs correction to eliminate this rotation.

The preamble processing section 25 detects P1, an example of the first preamble signal, from the OFDM time domain signal supplied from the time domain carrier frequency offset correction section 21. The same section 25 performs "fine" and "coarse" carrier frequency offset estimation using P1, thus detecting "fine" and "coarse" estimated carrier frequency offsets.

Then, the preamble processing section 25 supplies the "fine" estimated carrier frequency offset to the time domain carrier frequency offset correction section 21 and the "coarse" estimated carrier frequency offset to the frequency domain carrier frequency offset correction section 23 and rotation section 24.

Further, the same section 25 extracts the bits S1 and S2 from P1 and recognizes the transmission system representing either SISO or MISO, the FFT size of the OFDM symbols other than P1, and group information as to which group the GI length belongs to.

Still further, the preamble processing section 25 supplies information to the symbol synchronization section 26. Such information includes the P1 position information representing the P1 position on the OFDM time domain signal contained in the same signal from the time domain carrier frequency offset correction section 21 and the FFT size identified from the bits S1 and S2 contained in P1.

The symbol synchronization section 26 generates FFT trigger information based on the P1 position information, FFT size and other information from the preamble processing section 25 and supplies the FFT trigger information to the FFT computation section 22.

The FFT trigger information generated by the same section 26 includes the following information. That is, as for P2, an example of the second preamble signal following P1, the FFT trigger information includes the beginning of the effective symbol as a start position of FFT computation on P2. The beginning of the effective symbol is later by the GI length estimated from the GI length estimated from the OFDM signal by an unshown block or the GI length contained in the preset from the position indicated by the P1 position information.

In the OFDM receiver configured as described above, the preamble processing section 25 detects P1 from the OFDM time domain signal supplied via the time domain carrier frequency offset correction section 21 and performs "fine" and "coarse" carrier frequency offset estimation using P1, thus detecting "fine" and "coarse" estimated carrier frequency offsets.

Then, the preamble processing section 25 supplies the "fine" estimated carrier frequency offset to the time domain carrier frequency offset correction section 21 and the "coarse" estimated carrier frequency offset to the frequency domain carrier frequency offset correction section 23 and rotation section 24.

Further, the same section 25 generates P1 position information representing the P1 position on the OFDM time domain signal and other information and supplies the information to the symbol synchronization section 26.

The symbol synchronization section 26 generates FFT trigger information from the preamble processing section 25 and supplies this information to the FFT computation section 22.

On the other hand, the time domain carrier frequency offset correction section 21 corrects the OFDM time domain signal supplied thereto in accordance with the "fine" estimated carrier frequency offset supplied from the preamble processing section 25 and supplies the corrected signal to the FFT computation section 22 and preamble processing section 25.

The FFT computation section 22 performs FFT computation on the OFDM time domain signal supplied from the time domain carrier frequency offset correction section 21 in accordance with the FFT trigger information supplied from the symbol synchronization section 26. The same section 22 supplies the OFDM frequency domain signal obtained from the FFT computation to the frequency domain carrier frequency offset correction section 23 together with the carrier index.

The frequency domain carrier frequency offset correction section 23 performs "coarse" carrier frequency offset correction adapted to correct the OFDM time domain signal supplied from the FFT computation section 22 in accordance with the "coarse" estimated carrier frequency offset supplied from the preamble processing section 25. The same section 23 supplies the corrected signal to the rotation section 24 together with the carrier index.

The rotation section 24 corrects the OFDM frequency domain signal supplied from the frequency domain carrier frequency offset correction section 23 in accordance with the GI length estimated by un unshown block or that contained in the preset and the "coarse" estimated carrier frequency offset supplied from the preamble processing section 25. The same section 24 supplies the corrected signal to unshown blocks in the subsequent stage adapted to handle equalization, error correction, decoding and other processes together with the carrier index supplied from the frequency domain carrier frequency offset correction section 23.

[Carrier Frequency Offset Estimation Using P1]

If an OFDM signal has a carrier frequency offset (and a "coarse" carrier frequency offset in particular), it is difficult to properly obtain information signalled in P1 and P2 (accurately modulate P1 and P2).

As a result, carrier frequency offset correction is required first after the reception of an OFDM signal.

Therefore, the OFDM receiver shown in FIG. 5 estimates a carrier frequency offset using P1, thus detecting an estimated carrier frequency offset and performing carrier frequency offset correction in accordance with the estimated carrier frequency offset.

Figure 4:
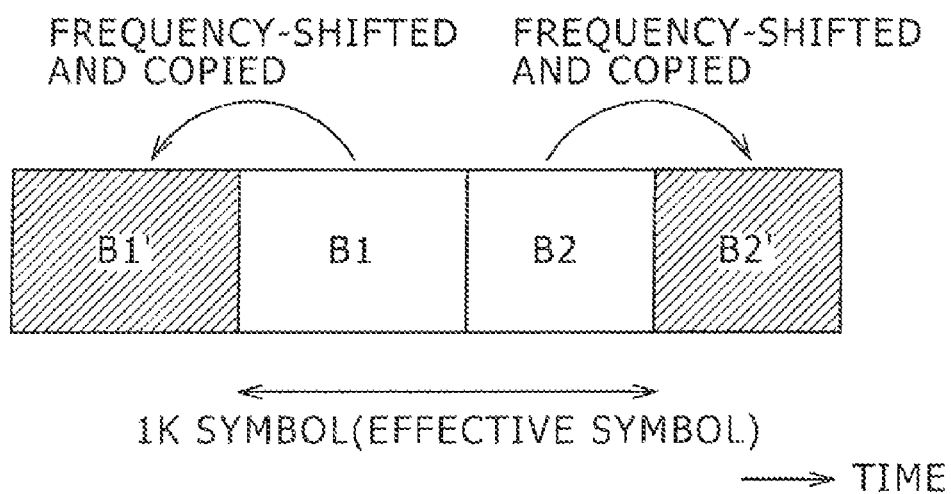
FIG. 4 is a diagram illustrating a P1 OFDM signal.

As described above, according to the Implementation Guidelines, it is possible, thanks to the P1 cyclic structure described in FIG. 4, to perform "fine" carrier frequency offset estimation in units of less than a subcarrier spacing that falls within the range from −0.5× subcarrier spacing to +0.5× subcarrier spacing.

For this reason, the preamble processing section 25 (FIG. 5) estimates a "fine" carrier frequency offset using P1 to detect a "fine" estimated carrier frequency offset.

For example, if the OFDM signal transmission band is, for example, 8 MHz, a value falling within the range 8929/2 Hz above and below the set frequency closest to the subcarrier c#i is detected as a "fine" estimated carrier frequency offset.

According to the Implementation Guidelines, on the other hand, if the OFDM signal transmission band is, for example, 8 MHz, it is possible, as described earlier, to perform "coarse" carrier frequency offset estimation in units of a subcarrier spacing spanning a maximum range from −500 kHz to +500 kHz based on the correlation between the P1 OFDM signal subcarrier locations.

For this reason, the preamble processing section 25 estimates a "coarse" carrier frequency offset using P1 to detect a "coarse" estimated carrier frequency offset.

A description will be given below of "coarse" carrier frequency offset estimation using P1 performed by the preamble processing section 25 shown in FIG. 5 with reference to FIGS. 6 and 7.

Figure 6:
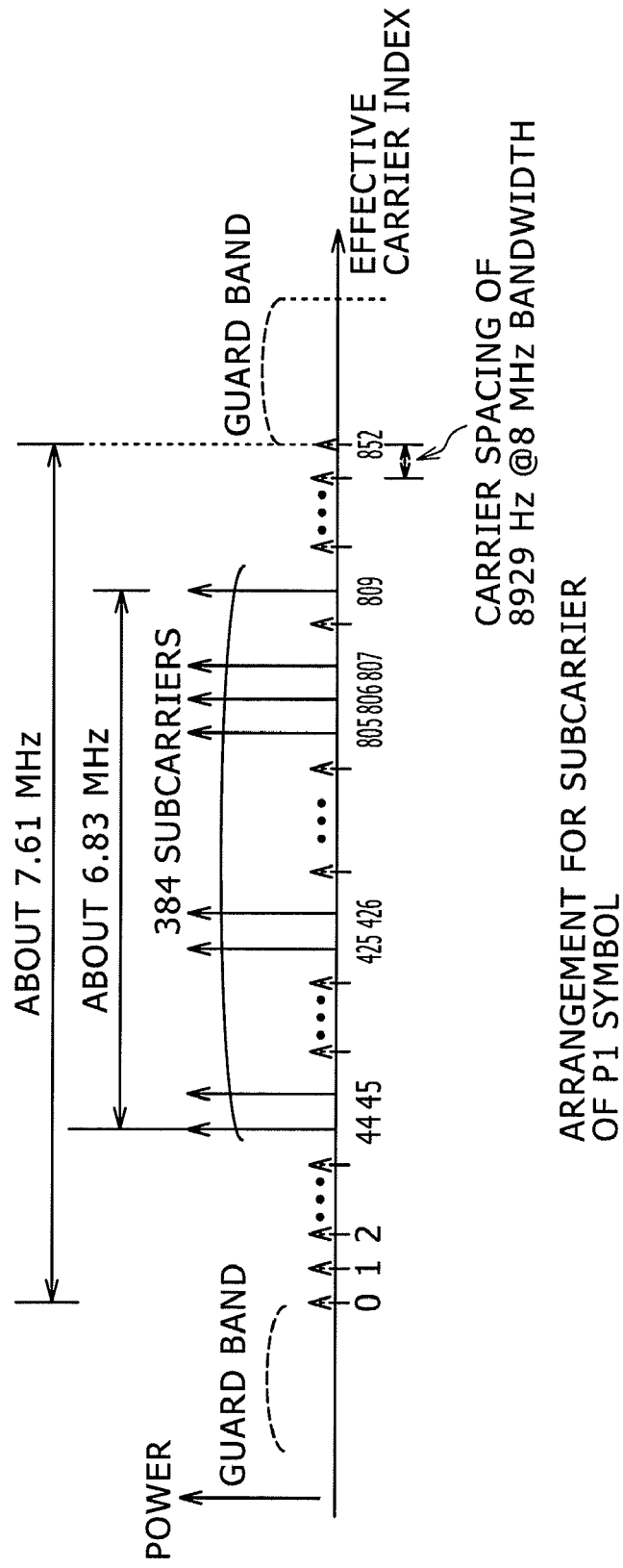
FIG. 6 is a diagram illustrating the power of the P1 OFDM signal.

FIG. 6 is a diagram illustrating the power of a P1 OFDM signal.

It should be noted that, in FIG. 6 (and also in FIG. 7), the horizontal axis represents the carrier index in frequency, and the vertical axis the subcarrier power.

As described earlier, the P1 OFDM signal has 853 subcarriers as effective subcarriers. In DVB-T2, 384 of the 853 subcarriers are assigned information (locations).

It should be noted that if the OFDM signal transmission band is, for example, 8 MHz, the P1 subcarrier spacing is (about) 8929 Hz as described earlier.

The preamble processing section 25 (FIG. 5) estimates a "coarse" carrier frequency offset using P1 to detect a "coarse" estimated carrier frequency offset based on the correlation between the above 384 subcarrier locations of the P1 OFDM signal.

Figure 7:
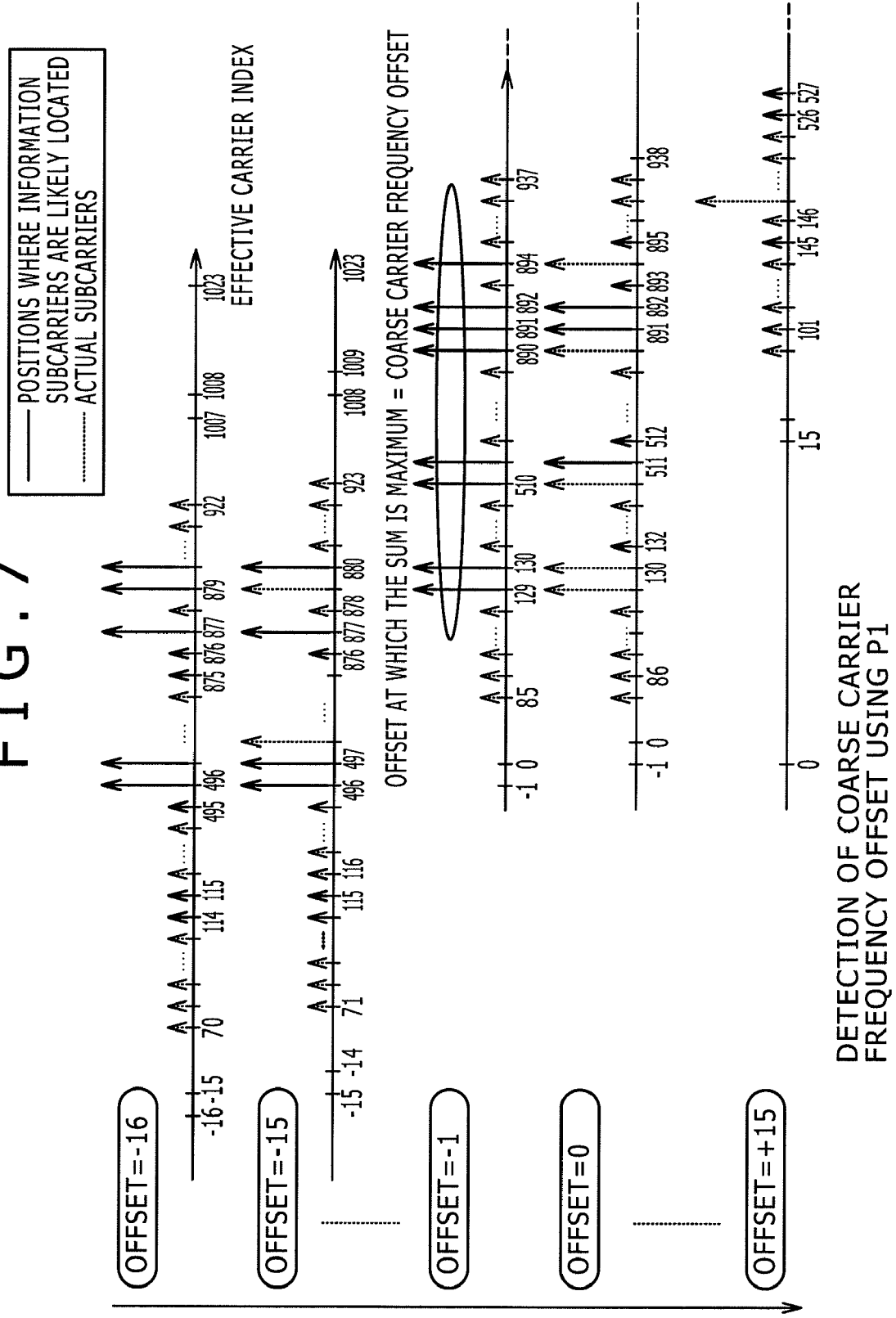
FIG. 7 is a diagram describing a "coarse" carrier frequency offset estimation method used by a preamble processing section.

FIG. 7 is a diagram describing a "coarse" carrier frequency offset estimation method used by the preamble processing section 25.

In FIG. 7, the solid and dashed arrows represent the 853 effective subcarriers of the P1 OFDM signal. On the other hand, the solid arrows represent those subcarriers (384 subcarriers) whose sum which will be calculated, of all the 853 effective subcarriers, as described later.

Further, the long arrows of all the arrows representing the 853 effective subcarriers denote the 384 subcarriers to which information is assigned. As a result, the power (and amplitude) of the 384 subcarriers to which information is assigned is (are) large.

On the other hand, the short arrows represent the subcarriers to which no information is assigned. As a result, the power of the subcarriers to which no information is assigned is small.

P1$s$ (subcarriers) shown in FIG. 7 have a −1 carrier frequency offset.

Here, the sign (positive or negative) of the carrier frequency offset represents the direction of deviation of the subcarrier positions (frequencies). That is, a positive frequency offset indicates that the subcarriers deviate in the direction of higher frequencies. On the other hand, a negative frequency offset indicates that the subcarriers deviate in the direction of lower frequencies.

Further, the magnitude (absolute value) of the frequency offset represents the magnitude of deviation of the subcarriers, with "1" representing a deviation by a subcarrier spacing.

Therefore, a frequency offset of −1 means that the subcarriers deviate by one subcarrier spacing in the direction of lower frequencies.

In P1, the 384 subcarriers to which information is assigned (hereinafter also referred to as the information subcarriers) are provided at the predetermined positions (positions on the frequency axis).

The predetermined positions of the 384 information subcarriers having, as a starting point (reference), the beginning of P1 are assumed to be known positions. When the carrier frequency offset of the OFDM signal is 0, all the 384 information subcarriers with large power are located at the known positions. Therefore, the sum of the power (or amplitude) of the 384 subcarriers is large.

On the other hand, if the carrier frequency offset of the OFDM signal ("coarse" carrier frequency offset) is not 0, some of the 384 information subcarriers with large power are not located at the known positions. Therefore, the sum of the power (or amplitude) of the 384 subcarriers is smaller than when all the 384 information subcarriers are located at the known positions.

For each of a plurality of offset amounts offset in the detection range spanning from a minimum MIN to a maximum MAX of an offset amount offset representing a carrier frequency offset of a predetermined number of subcarriers, therefore, the preamble processing section 25 finds the sum of power of the subcarriers at known positions. The known positions are a plurality of positions (384 positions) having, as a starting point, a position deviating by the offset amount offset from the beginning of P1.

Then, the preamble processing section 25 detects the maximum of all the sums of power of the subcarriers for each of the plurality of offset amounts offset that are integers in the detection range spanning from the minimum MIN to maximum MAX, thus detecting the offset amount offset associated with the maximum sum as a "coarse" estimated carrier frequency offset.

In FIG. 7, the sum of power of the subcarriers at the known positions having, as a starting point, a position deviating by the offset amount offset from the beginning of P1 is found for each of 32 offset amounts offset in the detection range spanning from the minimum MIN of −16 to the maximum MAX of +15.

In FIG. 7, because the carrier frequency offset is −1 as described earlier, the sum of power of the subcarriers is maximum when the offset amount offset is −1.

[OFDM Signal Demodulation Sequences]

Figure 8:
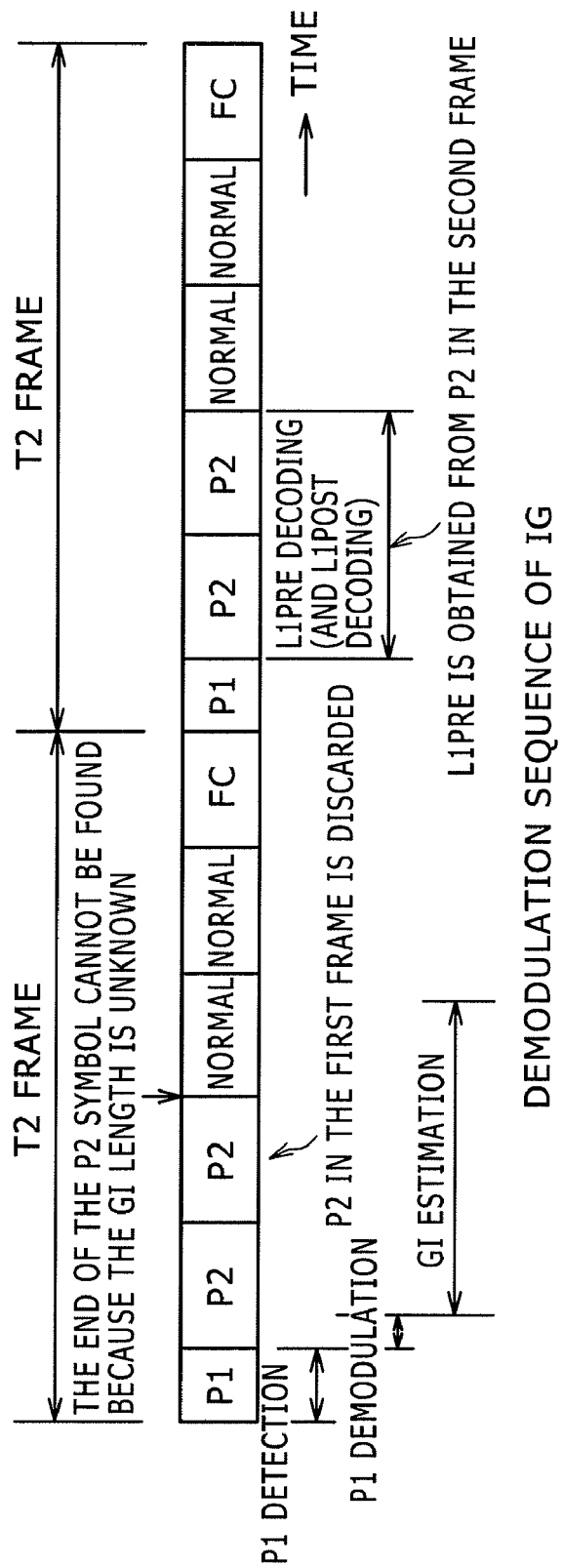
FIG. 8 is a diagram describing a series of demodulation sequences considering the P1 and P2 signallings and the OFDM signal carrier frequency offset that are introduced in the Implementation Guidelines.

FIG. 8 is a diagram describing a series of demodulation sequences considering the P1 and P2 signallings and the OFDM signal carrier frequency offset that are introduced in the Implementation Guidelines.

That is, FIG. 8 illustrates T2 frame sequences.

According to the demodulation sequences described in the Implementation Guidelines, the OFDM receiver detects P1 (P1 detection) first when activated.

After detecting P1, the OFDM receiver performs "fine" and "coarse" carrier frequency offset correction on P1.

After the carrier frequency offset correction, P1 can be demodulated (P1 signalling can be decoded) (P1 demodulation). This allows for the OFDM receiver to recognize the FFT sizes of P2, data (NORMAL) and FC.

Further, the OFDM receiver can recognize the group information regarding the GI length as a result of the P1 demodulation. It should be noted, however, that the OFDM receiver cannot recognize the GI length itself. As illustrated in FIG. 8, therefore, when a T2 frame contains a plurality of P2s such as two P2 OFDM symbols, the OFDM receiver is unable to identify the start position of the second or succeeding P2.

As a result, after the reception of the OFDM signal begins, the OFDM receiver cannot demodulate the plurality of P2s in the first T2 frame (T2 frame in which P1 has been demodulated).

Therefore, the OFDM receiver must estimate the GI length (perform GI estimation) required to demodulate P2s using the remaining symbols of the first T2 frame.

After estimating the GI length, the OFDM receiver waits for the next (second) T2 frame, extracting and demodulating P2 following P1 based on the FFT size recognized from P1 and GI length estimated from the first T2 frame.

Figure 3:
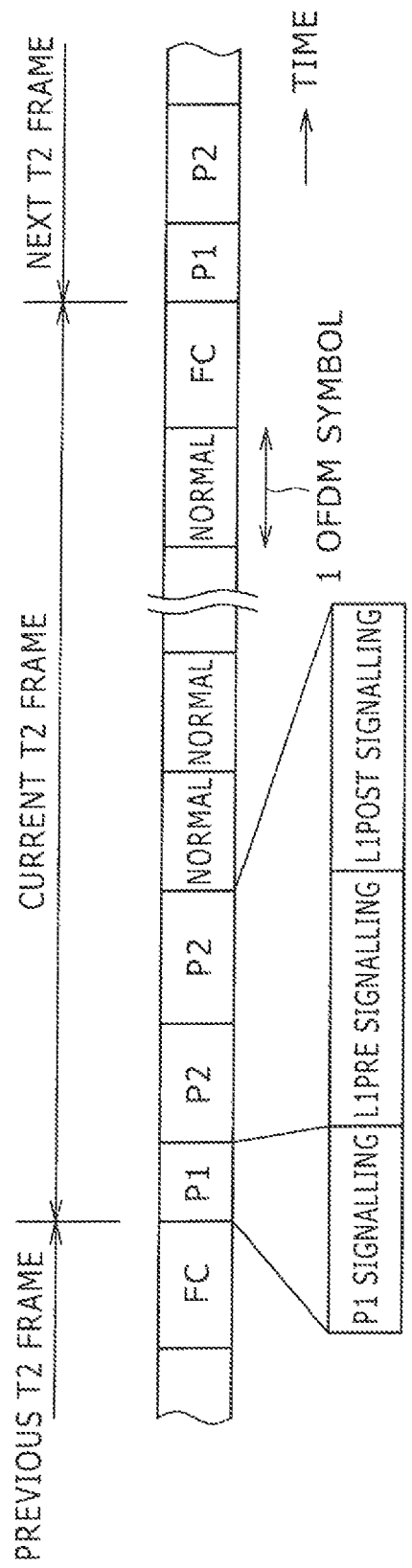
FIG. 3 is a diagram illustrating a T2 frame format.

The OFDM receiver successfully obtains not only L1PRE but also L1POST (FIG. 3) (L1PRE decoding (and L1POST decoding)) as a result of the P2 demodulation. The OFDM receiver can demodulate data (Normal) and FC using the L1PRE and L1POST information.

In the demodulation sequences introduced in the Implementation Guidelines, P2 cannot be demodulated in the first T2 frame because of the estimation of the GI length. This delays the demodulation of data (including FC) by one T2 frame.

For this reason, we consider making available accurate transmission parameters required for demodulation of P2s (their L1PRE) or data (including FC) in advance in the OFDM receiver and using these parameters for demodulation.

It should be noted that, presets are obtained, for example, by a television receiver equipped an OFDM receiver through a so-called channel scan that is conducted during the initial setup after the purchase. The TV receiver obtains the presets of the channels it can receive.

The presets of the receivable channels can be obtained by downloading from a network such as the Internet or by reading from the TV receiver memory in which the channel presents are stored in advance.

Here, the transmission parameters required for demodulation of the data (including FC) are FFT size, transmission system representing either SISO or MISO, GI length, pilot pattern (PP), whether the transmission band is extended (BWT_EXT) and the number of OFDM symbols per T2 frame (NDSYM).

On the other hand, the transmission parameters required for demodulation of P2 (L1PRE thereof) are FFT size, transmission system and GI length.

It should be noted that the FFT size and transmission system can be recognized from P1. Therefore, there need only be, as presets, at least the transmission parameters other than the FFT size and transmission system of all the above parameters required.

If, for example, the transmission parameters required for demodulation of P2 (L1PRE thereof) are made available in advance as presets, the OFDM receiver can demodulate P2 (L1PRE thereof) using the presets and demodulate the data (including FC) using the pilot pattern (PP), whether the transmission band is extended (BWT_EXT) and the number of OFDM symbols per T2 frame (NDSYM) obtained as a result of the demodulation in addition to the presets.

FIGS. 9A and 9B are diagrams describing the demodulation of the OFDM signal using presets.

FIG. 9A illustrates a T2 frame sequence with an FFT size other than 16 K or 32 K.

A T2 frame with an FFT size other than 16 K or 32 K contains one P2 (one OFDM symbol) or more.

When presets are used, the OFDM receiver detects P1 in the first T2 frame (P1 detection) and demodulates P1 (P1 demodulation).

Further, the OFDM receiver extracts P2 from the first T2 frame and demodulates P2 using the GI length and other parameters as the presets and demodulates data (Normal) and FC using the L1PRE and L1POST information obtained as a result of demodulation of P2.

As described above, using presets allows for demodulation of data (including FC) from the first T2 frame. That is, using presets provides faster demodulation of data (including FC) by one (T2) frame than when no presets are used as in the case shown in FIG. 8.

FIG. 9B illustrates a T2 frame sequence with an FFT size of 16 K or 32 K.

A T2 frame with an FFT size of 16 K or 32 K contains only one P2 or P2 OFDM symbol (therefore, it is not necessary to identify the beginning of the second or succeeding P2).

Therefore, when the FFT size is 16 K or 32 K, it is possible to demodulate P2 even if the GI length is not available as a preset.

As a result, data (including FC) can be demodulated starting from the first T2 frame as in the case shown in FIG. 9A.

Incidentally, "coarse" carrier frequency offset detection adapted to estimate a "coarse" carrier frequency offset and detect the estimated offset using P1 in the presence of a "coarse" carrier frequency offset in an OFDM signal takes a long time because this detection finds the sum of power of the subcarriers at known positions having, as a starting point, a position deviating by the offset amount offset from the beginning of P1 for each of the plurality of offset amounts offset in the detection range spanning from the minimum MIN to maximum MAX.

Figure 1:
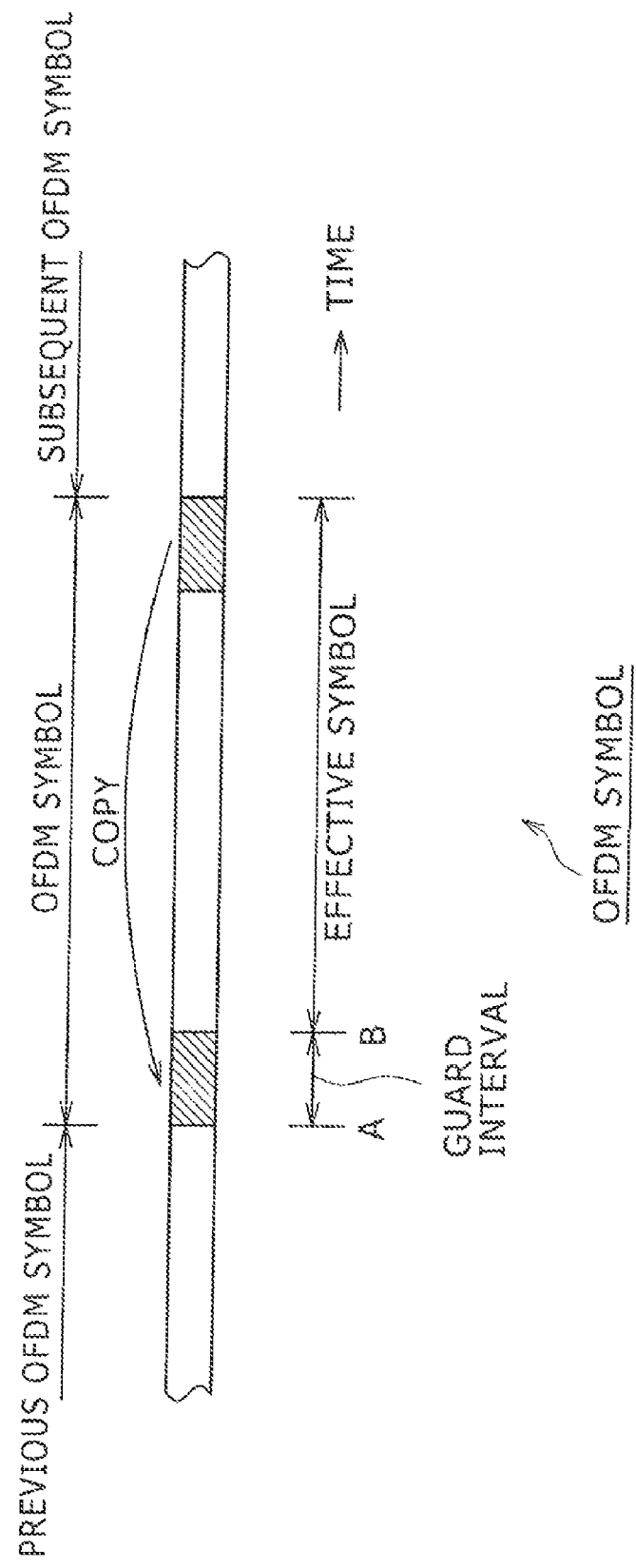
FIG. 1 is a diagram illustrating an OFDM symbol.
Figure 2:
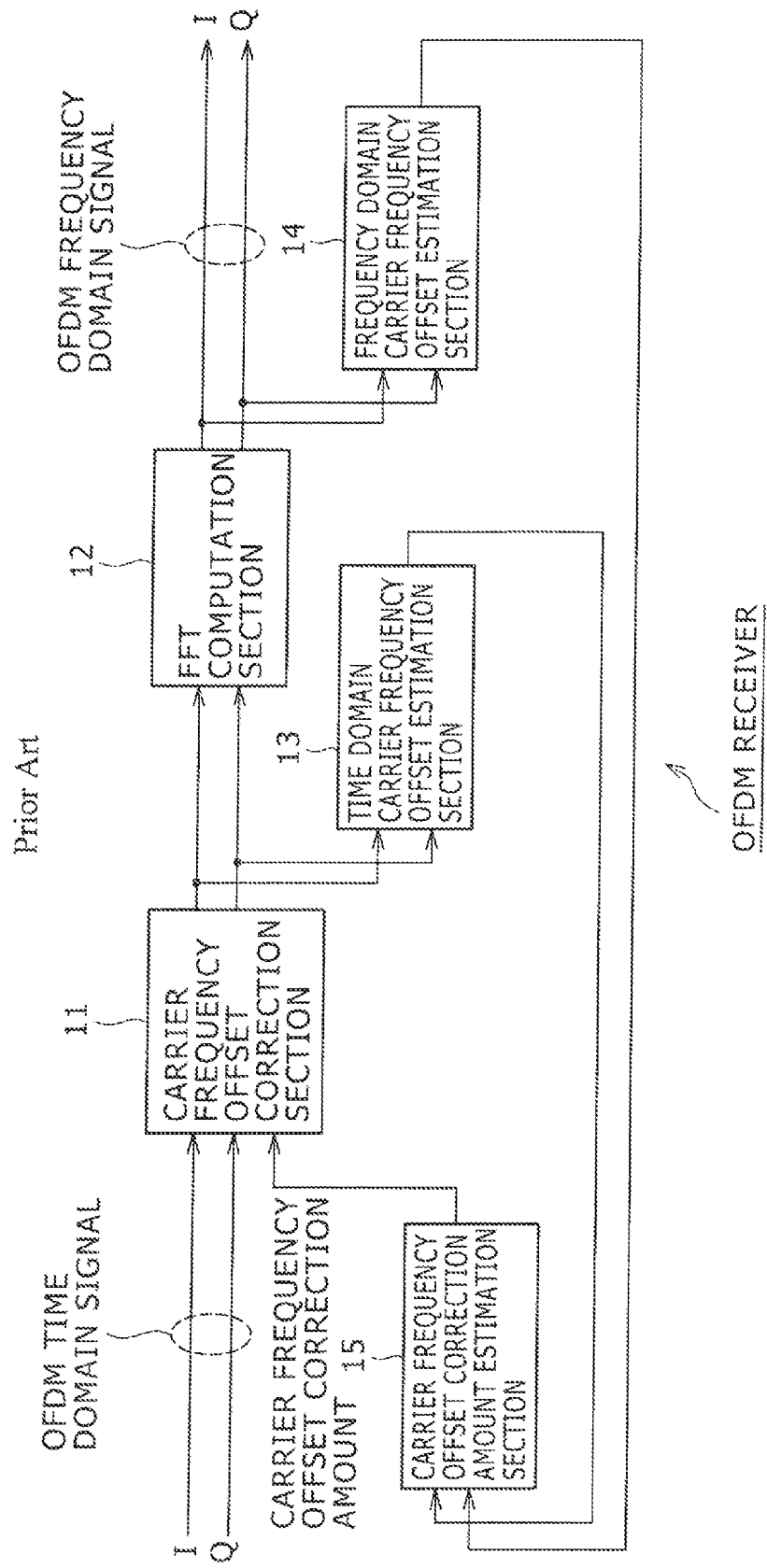
FIG. 2 is a block diagram illustrating an example of configuration of an existing OFDM receiver.

In the existing OFDM receiver shown in FIG. 2, if "coarse" carrier frequency offset detection using P1 takes a long time, P2 following P1 passes through the carrier frequency offset correction section 11 during that period. As a result, it is impossible to perform "coarse" carrier frequency offset correction of P2, making it impossible to establish synchronization and demodulate P2 accurately.

That is, FIG. 10 is a diagram describing the demodulation of an OFDM signal using presets when the OFDM signal has a "coarse" carrier frequency offset.

It should be noted that FIG. 10A illustrates a T2 frame sequence with an FFT size other than 16 K or 32 K, and FIG. 10B a T2 frame sequence with an FFT size of 16 K or 32 K.

If an OFDM signal has a "coarse" carrier frequency offset, P2 following P1 in the first T2 frame passes through the carrier frequency offset correction section 11 while the existing OFDM receiver shown in FIG. 2 performs "coarse" carrier frequency offset detection (coarse carrier offset estimation) using P1. As a result, it is impossible to perform "coarse" carrier frequency offset correction of P2, making it impossible to establish synchronization and demodulate P2 accurately.

As a result, the OFDM receiver shown in FIG. 2 must wait for the next T2 frame, demodulate P2 following P1 in that T2 frame and then demodulate data (including FC).

Therefore, the OFDM receiver shown in FIG. 2 cannot demodulate P2 in the first T2 frame even by using presets if the OFDM signal has a "coarse" carrier frequency offset, thus delaying the demodulation of data (including FC) by one T2 frame.

In the OFDM receiver shown in FIG. 5, therefore, the frequency domain carrier frequency offset correction section 23 performs "coarse" carrier frequency offset correction of the OFDM frequency domain signal obtained as a result of FFT computation of the OFDM time domain signal performed by the FFT computation section 22 in accordance with the "coarse" estimated carrier frequency offset detected using P1.

Then, the FFT computation section 22 performs FFT computation of P2 following P1 in parallel with the carrier frequency offset detection performed by the preamble processing section 25 using P1 in the first T2 frame.

Therefore, while the FFT computation of P2 in the first T2 frame by the FFT computation section 22 is in progress, the "coarse" carrier frequency offset detection by the preamble processing section 25 using P1 in the first T2 frame ends. As a result, the frequency domain carrier frequency offset correction section 23 at the subsequent stage of the FFT computation section 22 performs "coarse" carrier frequency offset correction of P2 that has been subjected to FFT computation, i.e., P2 in the first T2 frame, thus establishing synchronization.

This allows for accurate demodulation of P2 in the first T2 frame, making it possible to demodulate data (Normal) and FC using the P2 information or speedily demodulate data starting from the first T2 frame.

Figure 11A:
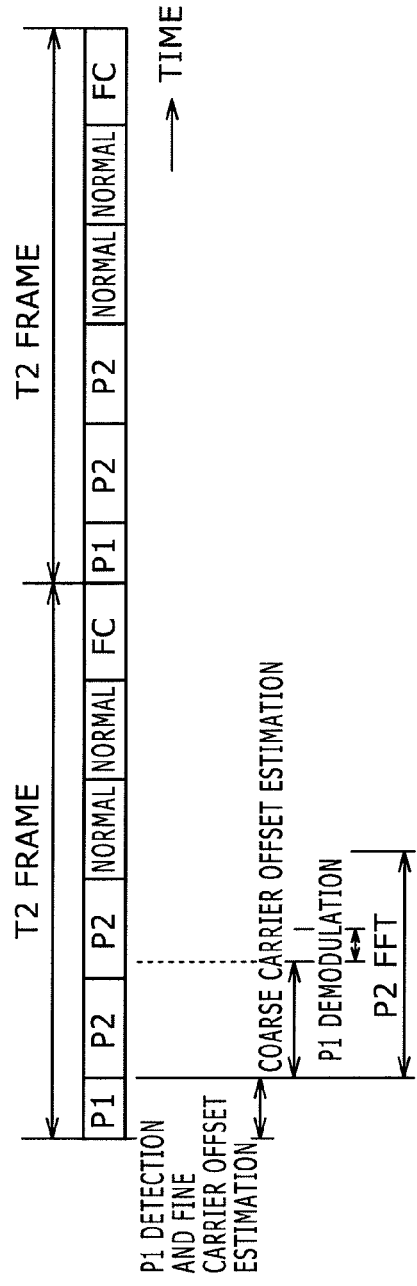
FIGS. 11A and 11B are diagrams describing the demodulation of the OFDM signal by an OFDM receiver when the OFDM signal has a "coarse" carrier frequency offset.
Figure 11B:
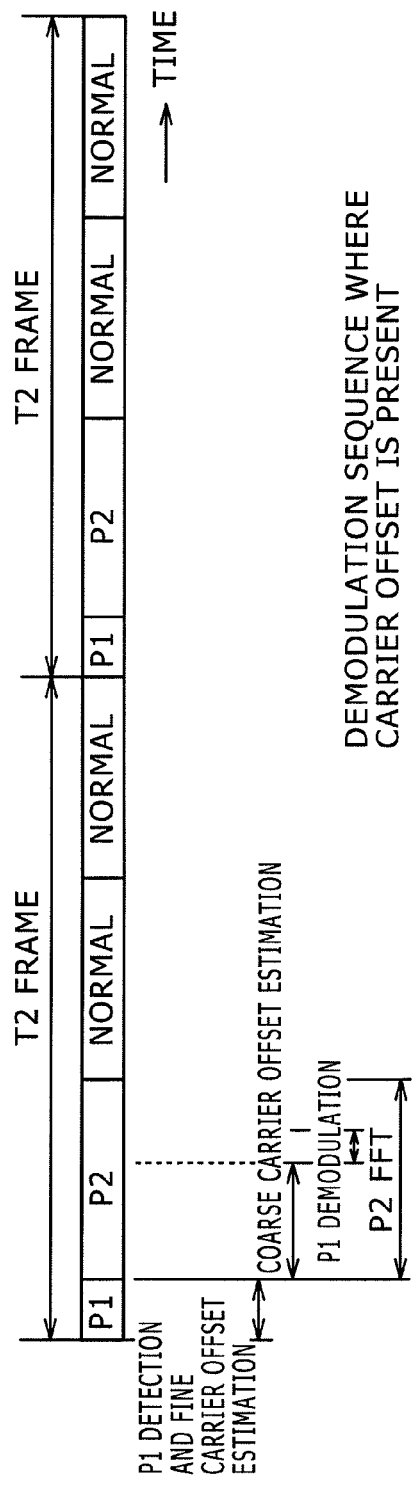

FIGS. 11A and 11B are diagrams describing the demodulation of the OFDM signal by the OFDM receiver shown in FIG. 5 when the OFDM signal has a "coarse" carrier frequency offset.

It should be noted that FIG. 11A illustrates a T2 frame sequence with an FFT size other than 16 K or 32 K and FIG. 11B a T2 frame sequence with an FFT size of 16 K or 32 K.

In the OFDM receiver shown in FIG. 5, while the FFT computation section 22 performs FFT computation of P2 in the first T2 frame, the preamble processing section 25 performs "coarse" carrier frequency offset detection (coarse carrier offset estimation) using P1 in the first T2 frame, thus detecting a "coarse" estimated carrier frequency offset.

Then, after the FFT computation of P2 in the first T2 frame ends, the frequency domain carrier frequency offset correction section 23 at the subsequent stage of the FFT computation section 22 performs "coarse" carrier frequency offset correction of P2 that has been subjected to FFT computation.

Here, the OFDM receiver shown in FIG. 5 uses presets as the transmission parameters required for demodulation of P2 (and data (including FC)) to process the first P2 frame after the reception of the OFDM signal.

It should be noted that if the FFT size recognized from P1 is 16 K or 32 K and if the GI length, one of the parameters required for demodulation of P2 (and data (including FC)), is not available as a preset, the OFDM receiver shown in FIG. 5 uses either 0 or $1/128$, the minimum value specified in DVB-T2, as the GI length.

However, if 0 or $1/128$, the minimum value specified in DVB-T2, is used as the GI length, one of the transmission parameters required for demodulation, this GI length is not accurate. Therefore, the GI length must be estimated for the first T2 frame. Further, it is difficult for the rotation section 24 (FIG. 5) to correct the rotation of the OFDM frequency domain signal in the IQ constellation attributable to the "coarse" carrier frequency offset.

In this case, the rotation of the OFDM frequency domain signal attributable to the "coarse" carrier frequency offset is remedied by equalization performed at the subsequent stage of the rotation section 24.

[Carrier Frequency Offset Correction]

FIG. 12 is a diagram describing "coarse" carrier frequency offset correction by the frequency domain carrier frequency offset correction section 23 shown in FIG. 5.

As described with reference to FIG. 5, letting the carrier index of the j+1th (where j=0, 1, ... ) subcarrier from the lowest in frequency of the group of subcarriers c#i making up the OFDM symbols be denoted by letter j, the FFT computation section 22 associates the carrier index j with the j+1th subcarrier c#1, supplying the carrier index j to the frequency domain carrier frequency offset correction section 23 together with the arrangement of the plurality of subcarriers c#i as the group of subcarriers c#i making up the OFDM symbols.

If the OFDM signal has a "coarse" carrier frequency offset of +K, the subcarrier c#i making up the OFDM symbol that is the OFDM time domain signal obtained from the FFT computation section 22 is located close to the set frequency f#j that deviates by +K subcarrier spacings from the (inherent) set frequency f#i of the subcarrier c#i. As a result, the FFT computation section 22 associates the subcarrier c#i with the carrier index j=i+K rather than the inherent carrier index i.

The frequency domain carrier frequency offset correction section 23 changes, in accordance with the "coarse" estimated carrier frequency offset from the preamble processing section 25, the carrier index associated with the subcarrier c#i from the carrier index j that is not the inherent carrier index of the subcarrier c#i to the inherent carrier index i as the "coarse" carrier frequency offset correction.

FIG. 12 illustrates the arrangement of the plurality of subcarriers c#i as the group of the subcarriers making up the OFDM symbols obtained from the FFT computation section 22 (FFT output data), the carrier index j associated with the subcarrier c#i and the carrier index after "coarse" carrier frequency offset correction (corrected carrier index).

If the "coarse" estimated carrier frequency offset from the preamble processing section 25 is, for example, +10, the frequency domain carrier frequency offset correction section 23 changes the carrier index j, associated with the subcarrier c#i making up the OFDM symbol obtained from the FFT computation section 22, to the carrier index i (=j−10) obtained by subtracting 10 from the carrier index j.

[Detection Range Setting Process]

Figure 13:
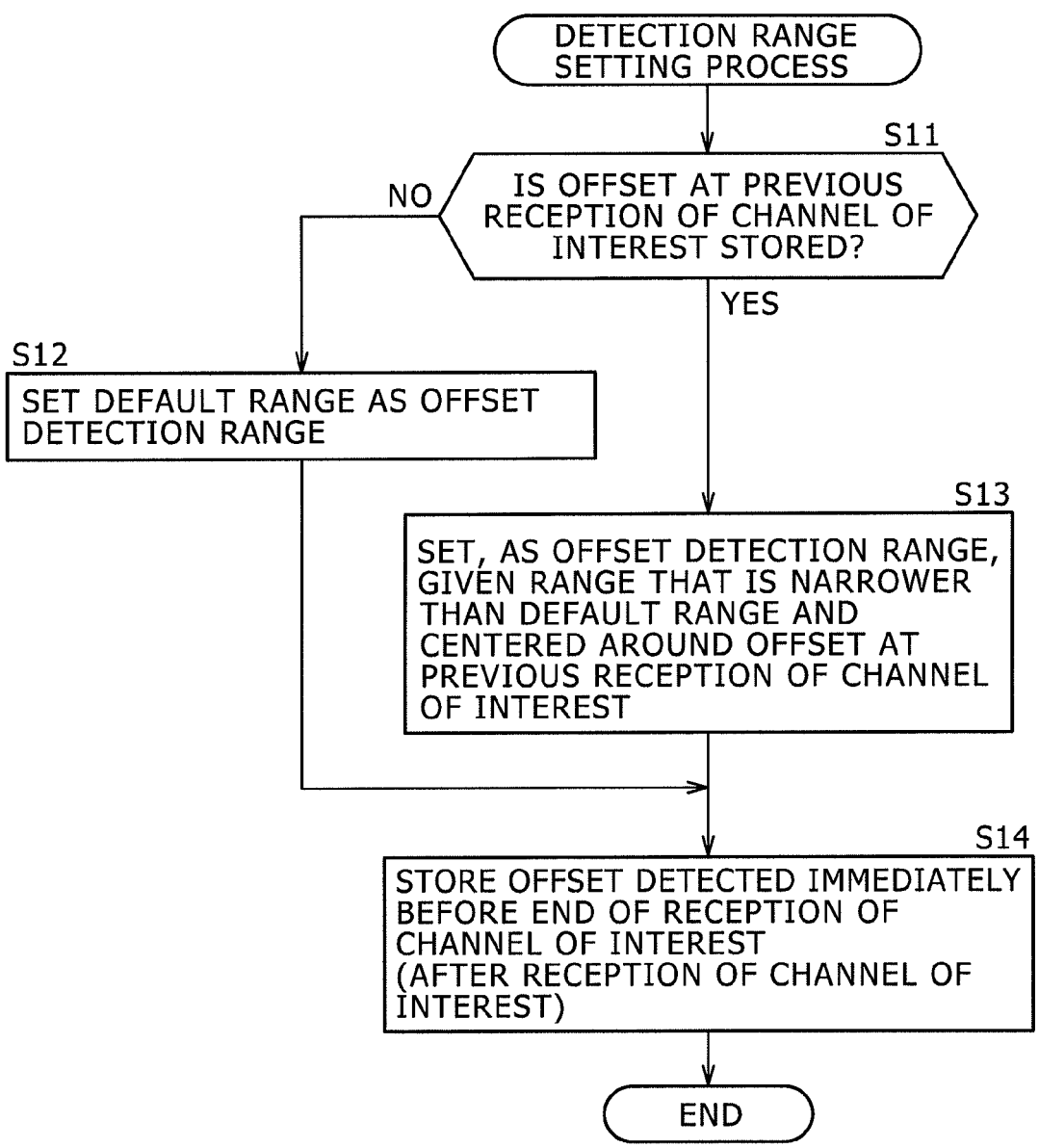
FIG. 13 is a flowchart describing a detection range setting process.

FIG. 13 is a flowchart describing a detection range setting process handled by the preamble processing section 25 shown in FIG. 5.

Here, in the OFDM receiver shown in FIG. 5, while the FFT computation section 22 performs FFT computation of P2 in the first T2 frame, the preamble processing section 25 performs "coarse" carrier frequency offset detection using P1 in the first T2 frame, thus detecting a "coarse" estimated carrier frequency offset.

Then, after the FFT computation of P2 in the first T2 frame ends, the frequency domain carrier frequency offset correction section 23 at the subsequent stage of the FFT computation section 22 performs "coarse" carrier frequency offset correction of P2 that has been subjected to FFT computation.

As described above, in order for the frequency domain carrier frequency offset correction section 23 to perform "coarse" carrier frequency offset correction of P2 in the first T2 frame after the FFT computation ends, the FFT computation section 22 must complete the FFT computation of P2 in the first T2 frame after the end of the "coarse" carrier frequency offset detection by the preamble processing section 25 using P1 in the first T2 frame.

However, when the FFT size of P2 is small such as 1 K or 2 K, only a short time is required for the FFT computation section 22 to perform the FFT computation of P2, causing the FFT computation of P2 to be completed early.

Then, if the FFT computation section 22 completes the FFT computation of P2 in the first T2 frame before the "coarse" carrier frequency offset detection by the preamble processing section 25 using P1 in the first T2 frame ends, the frequency domain carrier frequency offset correction section 23 is unable to perform "coarse" carrier frequency offset correction of P2 in the first T2 frame in accordance with the "coarse" estimated carrier frequency offset.

A possible solution to the above problem would be to provide a memory at the previous or subsequent stage of the FFT computation section 22 to delay data so that P2 in the first T2 frame that has been subjected to FFT computation is supplied from the FFT computation section 22 to the frequency domain carrier frequency offset correction section 23 after the "coarse" carrier frequency offset detection by the preamble processing section 25 using P1 in the first T2 frame ends.

However, this solution leads to a larger size OFDM receiver and higher cost because of the memory.

On the other hand, the preamble processing section 25 finds the sum of power of the subcarriers at known positions having, as a starting point, a position deviating by the offset amount offset from the beginning of P1 for each of the plurality of offset amounts offset in the detection range spanning from the minimum MIN to maximum MAX as described above during "coarse" carrier frequency offset detection.

Therefore, "coarse" carrier frequency offset detection takes time in proportion to the size (width) of the detection range. As a result, narrowing the detection range provides shorter time required for "coarse" carrier frequency offset detection.

For this reason, the preamble processing section 25 sets a detection range through a detection range setting process so as to perform "coarse" carrier frequency offset detection in a short period of time as necessary. This ensures that the "coarse" carrier frequency offset detection ends before the FFT computation section 22 completes the FFT computation of P2 with a small FFT size in the first T2 frame.

That is, when the user selects a channel, for example, the preamble processing section 25 determines in step S11 of the detection range setting process whether the offset amount offset at the previous reception of the channel of interest is stored in its incorporated memory (not shown).

Here, when a channel is received in step S14 of the detection range setting process, the preamble processing section 25 associates the offset amount offset as a "coarse" carrier frequency offset detected by the "coarse" carrier frequency offset detection with the channel, storing the offset amount offset in its incorporated memory.

If it is determined in step S11 that the offset amount offset for the channel of interest is not stored in the memory, the process proceeds to step S12 where the preamble processing section 25 sets a default range, a wide range, as a detection range, after which the process proceeds to step S14.

Here, if the OFDM signal transmission band is, for example, 8 MHz, the widest possible range as specified in the DVB-T2 standard, that is, the range equivalent to the ±500 kHz range that can be detected by "coarse" carrier frequency offset detection may be used as a default range.

On the other hand, when it is determined in step S11 that the offset amount offset for the channel of interest is stored in the memory, the process proceeds to step S13 where the preamble processing section 25 sets, as a detection range, a range narrower than the default range that includes the offset amount offset for the channel of interest stored in the memory (offset amount offset as the "coarse" estimated carrier frequency offset detected by the "coarse" carrier frequency offset detection at the previous reception of the channel of interest).

Here, it is likely that the "coarse" carrier frequency offset for the channel of interest at the current reception of the channel of interest does not change much from that at the previous reception thereof unless the reception conditions change significantly.

Therefore, when the offset amount offset for the channel of interest is stored in the memory, that is, when the offset amount offset as the "coarse" estimated carrier frequency offset detected by the "coarse" carrier frequency offset detection at the previous reception of the channel of interest is stored in the memory, the "coarse" carrier frequency offset detection can be performed accurately by setting, as a detection range, a narrow range that includes and is close to the estimated offset at the previous reception.

Setting a narrow detection range provides shorter time required for "coarse" carrier frequency offset detection. This prevents the FFT computation section 22 from completing the FFT computation of P2 in the first T2 frame before the "coarse" carrier frequency offset detection by the preamble processing section 25 using P1 in the first T2 frame ends.

In step S14, the preamble processing section 25 waits for the reception of the channel of interest to end as when the user changes the channel or turns off the power. Then, the same section 25 associates, for example, the offset amount offset detected by the "coarse" carrier frequency offset detection using P1 as a "coarse" estimated carrier frequency offset immediately before the end of the reception with the channel of interest, storing the offset in the memory (overwriting the offset if the offset amount offset at the previous reception of the channel of interest is stored) and terminating the detection range setting process.

It should be noted that, in FIG. 13, each time the user selects a channel, the offset amount offset detected by the "coarse" carrier frequency offset detection using P1 as a "coarse" estimated carrier frequency offset immediately before the end of the reception is stored in the memory for the channel (channel of interest). However, the offset amount offset may be stored in the memory as a "coarse" estimated carrier frequency offset, for example, only when a channel is selected for the first time.

Second Embodiment

Figure 14:
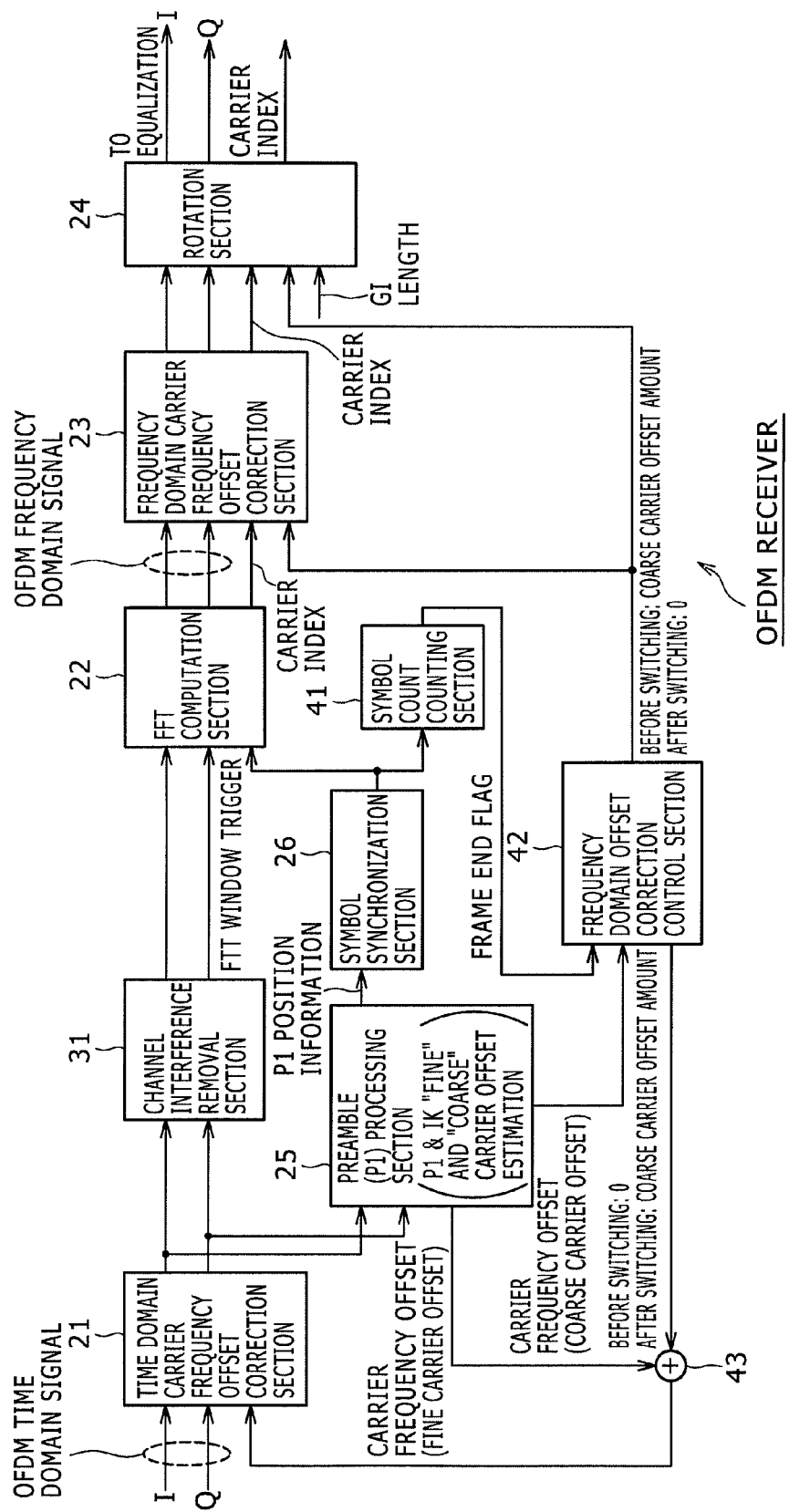
FIG. 14 is a block diagram illustrating a configuration example of a second embodiment of the signal processing apparatus to which the embodiment of the present invention is applied.

FIG. 14 is a block diagram illustrating a configuration example of a second embodiment of the signal processing apparatus adapted to function as an OFDM receiver to which the present invention is applied.

It should be noted that, in FIG. 14, like components as those in FIG. 5 are denoted by like reference numerals, and the description thereof will be omitted as appropriate.

That is, the OFDM receiver shown in FIG. 14 is the same as that shown in FIG. 5 in that it includes the time domain carrier frequency offset correction section 21 to the symbol synchronization section 26, and is different therefrom in that a channel interference removal section 31, symbol count counting section 41, carrier frequency offset correction control section 42 and computation section 43 are added anew.

A channel (transmission line) interference removal function may be provided in the block of the OFDM receiver adapted to process an OFDM time domain signal as in a TV receiver adapted to receive analog broadcasting.

In this case, when a channel interference removal process such as filtering is performed on the OFDM time domain signal in a specified frequency band, this OFDM time domain signal to be subjected to the channel interference removal process must undergo carrier frequency offset correction in advance.

In the OFDM receiver shown in FIG. 14, therefore, "coarse" carrier frequency offset correction of the first T2 frame is performed by the frequency domain carrier frequency offset correction section 23 at the subsequent stage of the FFT computation section 22. For the second and succeeding T2 frames, "coarse" carrier frequency offset correction is performed by the time domain carrier frequency offset correction section 21 adapted to handle "fine" carrier frequency offset correction.

That is, in the OFDM receiver shown in FIG. 14, the channel interference removal section 31 is supplied with an OFDM time domain signal from the time domain carrier frequency offset correction section 21.

The channel interference removal section 31 subjects the OFDM time domain signal from the time domain carrier frequency offset correction section 21 to the channel interference removal process, supplying the resultant signal to the FFT computation section 22.

The symbol count counting section 41 is supplied with FFT trigger information from the symbol synchronization section 26.

The same section 41 counts the number of pieces of the FFT trigger information from the symbol synchronization section 26, supplying a frame end flag to the carrier frequency offset correction control section 42 when the count reaches the number of OFDM symbols per T2 frame. The frame end flag indicates that the T2 frame has reached its end.

The carrier frequency offset correction control section 42 is supplied with not only the frame end flag from the symbol count counting section 41 but also a "coarse" estimated carrier frequency offset (offset amount offset) detected by the "coarse" carrier frequency offset detection using P1 from the preamble processing section 25.

The same section 42 supplies the "coarse" estimated carrier frequency offset from the preamble processing section 25 to the frequency domain carrier frequency offset correction section 23 and rotation section 24 and "0" to the computation section 43 as a "coarse" estimated carrier frequency offset for a time period from when the reception of the OFDM signal begins to when the frame end flag is supplied from the symbol count counting section 41, that is, while the first T2 frame is processed.

On the other hand, the carrier frequency offset correction control section 42 supplies the "coarse" estimated carrier frequency offset from the preamble processing section 25 to the computation section 43 and "0" to the frequency domain carrier frequency offset correction section 23 and rotation section 24 as a "coarse" estimated carrier frequency offset from the moment when the frame end flag is supplied from the symbol count counting section 41 onward following the start of reception of an OFDM signal, that is, after the processing of the second T2 frame begins.

The computation section 43 is supplied with not only the "coarse" estimated carrier frequency offset from the carrier frequency offset correction control section 42 but also a "fine" estimated carrier frequency offset detected by the "fine" carrier frequency offset detection using P1 (by estimating a "fine" carrier frequency offset using P1 and detecting the "fine" estimated carrier frequency offset) from the preamble processing section 25.

The same section 43 adds together the "coarse" estimated carrier frequency offset from the carrier frequency offset correction control section 42 and the "fine" estimated carrier frequency offset from the preamble processing section 25, supplying the sum of the two offsets to the time domain carrier frequency offset correction section 21 as an estimated carrier frequency offset.

In the OFDM receiver configured as described above, the carrier frequency offset correction control section 42 supplies the "coarse" estimated carrier frequency offset from the preamble processing section 25 to the frequency domain carrier frequency offset correction section 23 and rotation section 24 and "0" to the computation section 43 as a "coarse" estimated carrier frequency offset from when the reception of the OFDM signal begins to when the frame end flag is supplied from the symbol count counting section 41, that is, while the first T2 frame is processed.

Therefore, the frequency domain carrier frequency offset correction section 23 and rotation section 24 process the first T2 frame in the same manner as done by the OFDM receiver shown in FIG. 5 using the "coarse" estimated carrier frequency offset supplied from the carrier frequency offset correction control section 42 and detected by the preamble processing section 25.

On the other hand, the computation section 43 adds together "0," i.e., the "coarse" estimated carrier frequency offset from the carrier frequency offset correction control section 42, and the "fine" estimated carrier frequency offset from the preamble processing section 25, supplying the sum of the two offsets as the estimated carrier frequency offset, i.e., the "fine" estimated carrier frequency offset from the preamble processing section 25, to the time domain carrier frequency offset correction section 21.

Therefore, the time domain carrier frequency offset correction section 21 processes the first T2 frame in the same manner as done by the OFDM receiver shown in FIG. 5 using the "fine" estimated carrier frequency offset detected by the preamble processing section 25.

Then, the carrier frequency offset correction control section 42 is supplied with a frame end flag from the symbol count counting section 41 after the reception of the OFDM signal begins. From this moment onward, i.e., after the processing of the second T2 frame begins, the same section 42 supplies the "coarse" estimated carrier frequency offset from the preamble processing section 25 to the computation section 43 and "0" to the frequency domain carrier frequency offset correction section 23 and rotation section 24 as a "coarse" estimated carrier frequency offset.

Therefore, the frequency domain carrier frequency offset correction section 23 and rotation section 24 process the second and succeeding T2 frames using "0" supplied from the carrier frequency offset correction control section 42 as a "coarse" estimated carrier frequency offset.

That is, in this case, the frequency domain carrier frequency offset correction section 23 and rotation section 24 practically do not process the frames. As a result, the OFDM frequency domain signal passes through the same sections 23 and 24 without being processed.

On the other hand, the computation section 43 adds together the "coarse" estimated carrier frequency offset supplied from the carrier frequency offset correction control section 42 and detected by the preamble processing section 25 and the "fine" estimated carrier frequency offset supplied from the preamble processing section 25, supplying the sum of the two offsets to the time domain carrier frequency offset correction section 21 as the estimated carrier frequency offset.

For the second and succeeding T2 frames, therefore, the time domain carrier frequency offset correction section 21 simultaneously (indiscriminately) performs "coarse" and "fine" carrier frequency offset correction of the OFDM time domain signal in accordance with the sum of two offsets, i.e., the "coarse" estimated carrier frequency offset supplied from the carrier frequency offset correction control section 42 and detected by the preamble processing section 25 and the "fine" estimated carrier frequency offset.

A description has been given above of the case in which the present invention is applied to an OFDM receiver that functions as a signal processing apparatus adapted to process an OFDM signal compliant with the DVB-T2 standard. However, the present invention is also applicable to a signal processing apparatus adapted to process an OFDM signal containing preamble signals, a first preamble signal and a second preamble signal following the first one, in which information required for demodulation of data is signalled.

Such a signal processing apparatus is applicable, for example, to a television receiver, tuner, recorder and other equipment adapted to receive television broadcasting.

[Description of Computer to Which Embodiment of Present Invention is Applied]

The above series of processes may be performed by hardware or software. If the series of processes are performed by software, the program making up the software is installed, for example, to a general-purpose computer.

Figure 15:
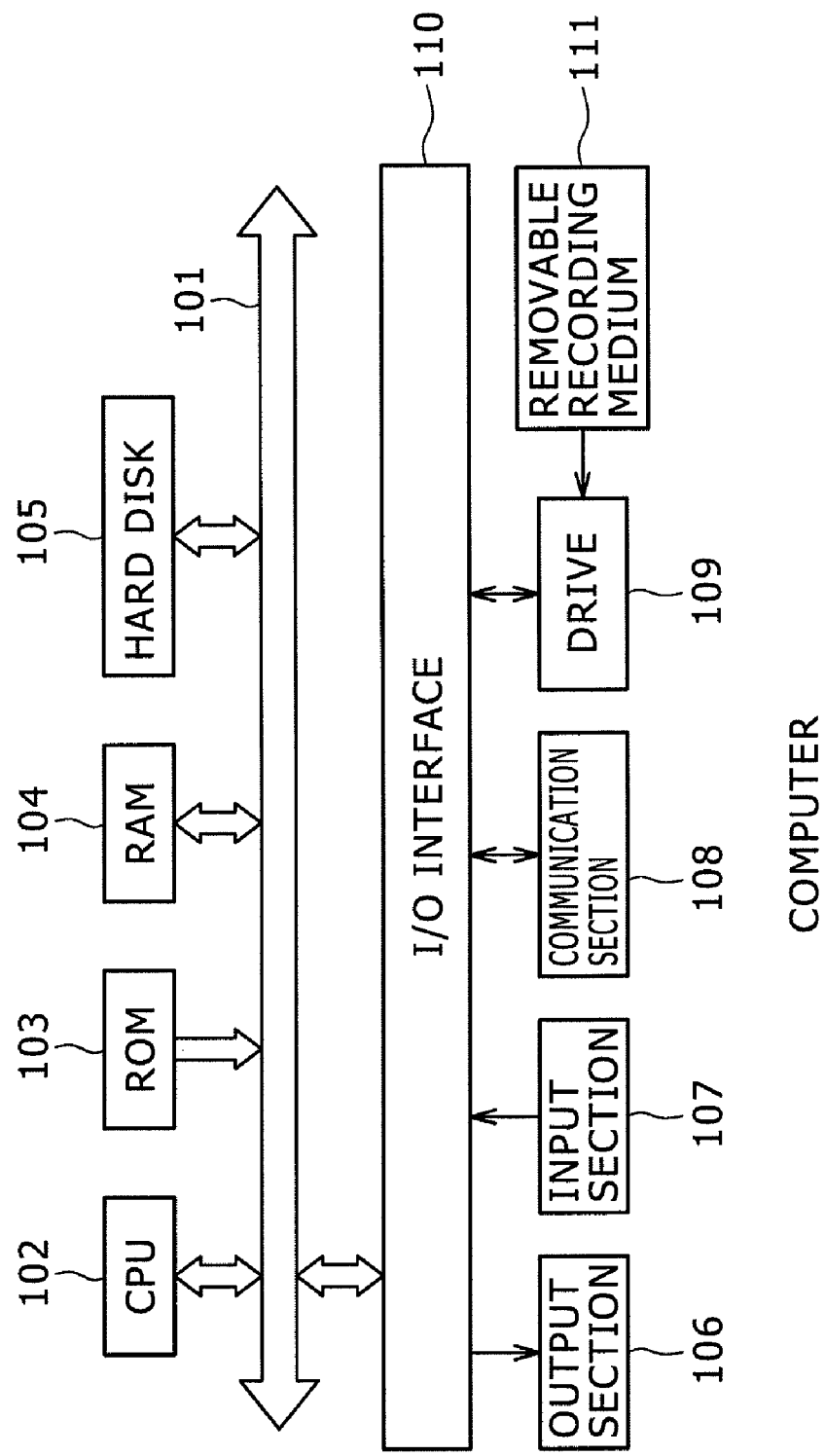
FIG. 15 is a block diagram illustrating a configuration example of an embodiment of a computer to which the embodiment of the present invention is applied.

For this reason, FIG. 15 illustrates a configuration example of an embodiment of a computer to which the program adapted to perform the above series of processes is installed.

The program may be recorded in advance in a hard disk 105 or ROM 103 incorporated in the computer to serve as a recording medium.

Alternatively, the program may be stored (recorded) in a removable recording medium 111. The removable recording medium 111 may be supplied as so-called package software. Here, among recording media that can be used as the removable recording medium 111 are flexible disk, CD-ROM (Compact Disc Read Only Memory), MO (Magneto Optical) disk, DVD (Digital Versatile Disc), magnetic disk and semiconductor memory.

It should be noted that the program may be not only installed from the removable recording medium 111 as described above but also downloaded via a communication or broadcasting network and installed to the incorporated hard disk 105. That is, the program may be, for example, transferred to the computer in a wireless manner via an artificial satellite for digital satellite broadcasting or in a wired manner via a LAN (Local Area Network), the Internet or other network from a downloading site.

The computer incorporates a CPU (Central Processing Unit) 102 to which an I/O interface 110 is connected via a bus 101.

When an instruction is input from the user as a result of the operation of an input section 107, the CPU 102 executes the program stored in the ROM (Read Only Memory) 103 in accordance with the instruction. Alternatively, the CPU 102 loads the program from the hard disk 105 into a RAM (Random Access Memory) 104 for execution.

This allows for the CPU 102 to proceed with the process as depicted in the above flowchart or that performed by the components of the signal processing apparatus shown in the above block diagrams. Then, the CPU 102 outputs the processing results from an output section 106 or transmits them from a communication section 108 via the I/O interface 110, or even stores the results to the hard disk 105.

It should be noted that the input section 107 includes, for example, a keyboard, mouse and microphone. On the other hand, the output section 106 includes, for example, an LCD (Liquid Crystal Display) and speaker.

Here, in the present specification, the processes performed by the computer in accordance with the program need not necessarily be performed chronologically according to the sequence shown in the flowchart. That is, the processes performed by the computer in accordance with the program include those that are performed in parallel or separately (e.g., parallel processes or processes using objects).

On the other hand, the program may be executed by a single computer (processor) or a plurality of computers in a distributed manner. Still further, the program may be transferred to a remote computer for execution.

It should be noted that the embodiments of the present invention are not limited to those described above but may be modified in various ways without departing from the spirit and scope of the present invention.

The present application contains subject matter related to that disclosed in Japanese Priority Patent Application JP 2009-173591 filed with the Japan Patent Office on Jul. 24, 2009, the entire content of which is hereby incorporated by reference.

What is claimed is:

1. A signal processing apparatus, comprising:
   computation means for performing transform computation adapted to Fourier-transform a time domain Orthogonal Frequency Division Multiplexing (OFDM) signal into a frequency domain OFDM signal;
   processing means for performing carrier frequency offset detection adapted to detect an estimated carrier frequency offset that is an error of a carrier used for demodulation of the OFDM signal; and
   carrier frequency offset correction means for performing carrier frequency offset correction to correct the carrier frequency offset of the frequency domain OFDM signal in accordance with the estimated carrier frequency offset, wherein
   the OFDM signal contains a first preamble signal and a second preamble signal following the first preamble signal, and
   the computation means performs the transform computation of the second preamble signal in parallel with the carrier frequency offset detection performed by the processing means using the first preamble signal.

2. The signal processing apparatus of claim 1, wherein
   the processing means finds a sum of subcarriers at positions having, as a starting point, a position deviating by an offset amount from the beginning of the first preamble signal for each of a plurality of offset amounts in a detection range spanning from minimum to maximum of the offset amount, the offset amount representing a carrier frequency offset of a predetermined number of subcarriers,
   the processing means detects the maximum of all the sums of the subcarriers obtained for each of the plurality of offset amounts so as to detect the offset amount associated with the maximum sum as the estimated carrier frequency offset,
   the processing means stores the estimated carrier frequency offset in association with a channel of the OFDM signal in which the estimated offset is detected,
   the processing means sets a default range as a detection range for use in the carrier frequency offset detection when the OFDM signal of a channel, for which the estimated carrier frequency offset is not stored, is received, and
   the processing means sets, as the detection range, a range narrower than the default range that includes the estimated carrier frequency offset associated with the channel when the OFDM signal of a channel, for which the estimated carrier frequency offset is stored, is received.

3. The signal processing apparatus of claim 1, further comprising:
   other carrier frequency offset correction means for performing carrier frequency offset correction to correct the carrier frequency offset of the time domain OFDM signal in accordance with the estimated carrier frequency offset, wherein
   the OFDM signal is transmitted in units of a frame, with each frame containing the one first preamble signal and the one or more second preamble signals, and
   the first frame after the beginning of reception of the OFDM signal is subjected to the carrier frequency offset correction by the carrier frequency offset correction means, and the succeeding frames are subjected to the carrier frequency offset correction by the other carrier frequency offset correction means.

4. A signal processing method, comprising the steps of:
   performing transform computation to Fourier-transform a time domain Orthogonal Frequency Division Multiplexing (OFDM) signal into a frequency domain OFDM signal;
   performing carrier frequency offset detection to detect an estimated carrier frequency offset that is an error of a carrier used for demodulation of the OFDM signal; and
   performing carrier frequency offset correction to correct the carrier frequency offset of the frequency domain OFDM signal in accordance with the estimated carrier frequency offset, wherein
   the OFDM signal contains a first preamble signal and a second preamble signal following the first preamble signal, and
   the transform computation of the second preamble signal is performed in parallel with the carrier frequency offset detection using the first preamble signal.

5. A signal processing apparatus, comprising:
   a computation device to perform transform computation to Fourier-transform a time domain Orthogonal Frequency Division Multiplexing (OFDM) signal into a frequency domain OFDM signal;
   a processing device to perform carrier frequency offset detection to detect an estimated carrier frequency offset that is an error of a carrier used for demodulation of the OFDM signal; and
   a carrier frequency offset correction device to perform carrier frequency offset correction to correct the carrier frequency offset of the frequency domain OFDM signal in accordance with the estimated carrier frequency offset, wherein
   the OFDM signal contains a first preamble signal and a second preamble signal following the first preamble signal, and
   the computation device performs the transform computation of the second preamble signal in parallel with the carrier frequency offset detection performed by the processing device using the first preamble signal.

* * * * *